US008663008B2

(12) United States Patent
Tsujino et al.

(10) Patent No.: US 8,663,008 B2
(45) Date of Patent: Mar. 4, 2014

(54) GAME APPARATUS, GAME PROGRAM AND RECORDING MEDIUM RECORDING THE PROGRAM

(75) Inventors: Hiroshi Tsujino, Ohta-ku (JP); Kunio Sasayama, Ohta-ku (JP); Daisuke Takeda, Taito-ku (JP)

(73) Assignee: Kabushiki Kaisha Sega, Tokyo (JP)

(*) Notice: Subject to any disclaimer, the term of this patent is extended or adjusted under 35 U.S.C. 154(b) by 474 days.

(21) Appl. No.: 13/130,471

(22) PCT Filed: Aug. 24, 2009

(86) PCT No.: PCT/JP2009/064720
§ 371 (c)(1),
(2), (4) Date: May 20, 2011

(87) PCT Pub. No.: WO2010/058641
PCT Pub. Date: May 27, 2010

(65) Prior Publication Data
US 2011/0223999 A1 Sep. 15, 2011

(30) Foreign Application Priority Data

Nov. 21, 2008 (JP) ................................ 2008-298600

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........ 463/37; 463/7; 463/30; 463/31; 463/36; 463/38

(58) Field of Classification Search
USPC ......................................... 463/30, 31, 36–38
See application file for complete search history.

(56) References Cited

U.S. PATENT DOCUMENTS

| 6,361,436 | B1 | 3/2002 | Gouji et al. |
| 6,589,117 | B1 | 7/2003 | Moritome et al. |
| 2001/0007830 | A1 | 7/2001 | Suzuki |
| 2003/0130037 | A1 | 7/2003 | Sugimori et al. |
| 2007/0032297 | A1 | 2/2007 | Hara |

FOREIGN PATENT DOCUMENTS

| JP | 11-226261 A | 8/1999 |
| JP | 2001-190840 A | 7/2001 |
| JP | 2001-198359 A | 7/2001 |

(Continued)

OTHER PUBLICATIONS

International Search Report and Written Opinion issued in corresponding International Application No. PCT/JP2009/064720 mailed Jun. 30, 2011 (8 pages).

(Continued)

*Primary Examiner* — Adetokunbo O Torimiro
(74) *Attorney, Agent, or Firm* — Osha Liang LLP

(57) ABSTRACT

A plurality of regions are set for a target, and target information for specifying information relating to a second movable object, which is set to be moveable toward a first movable object for each region, is stored. The game controller judges, in response to the operation of the operator, in which region the first movable object, at an arrival position, which has started movement from the reference position, is located, refers to the target information, and arranges the second movable object in a virtual space based on the information relating to the second movable object corresponding to the region in which the first movable object is located.

18 Claims, 18 Drawing Sheets

(56) References Cited

FOREIGN PATENT DOCUMENTS

| | | |
|---|---|---|
| JP | 3318555 B2 | 8/2002 |
| JP | 2005-230265 A | 9/2005 |
| JP | 3859012 A | 9/2006 |
| JP | 2006-334418 A | 12/2006 |
| JP | 2007-041814 A | 2/2007 |
| JP | 2007-098032 A | 4/2007 |
| WO | 2006/070741 A1 | 7/2006 |

OTHER PUBLICATIONS

International Search Report w/translation from PCT/JP2009/064720 dated Sep. 15, 2009 (4 pages).

GAME APPARATUS, GAME PROGRAM AND RECORDING MEDIUM RECORDING THE PROGRAM

BACKGROUND OF INVENTION

1. Technical Field

One or more embodiments of the present invention relate to a game apparatus, a game program and a recording medium rerecording the program, and relates to, for example, a technique for controlling a game apparatus for providing a player with a game in which the player operates an operation apparatus (input apparatus) interactively with a game screen on a display apparatus.

2. Background Art

Fishing games have been known as games in which a movable object displayed in a game screen is moved by operations of a player. Among such fishing games, there has been known a game in which a player competes against other players on the weights of fishes he/she has caught. There has also been known a game in which a trackball is used as an input apparatus, and the rotation speed and rotation direction of the trackball are used as input information.

In addition, there has also been known a game in which whether or not a target is hit is detected, and the number of medals to be presented is decided by lottery based on the hit (for example, see Patent Document 1 below).

Also, there has been known a fishing game which displays a fish radar (for example, see Patent Document 2 below), as well as a dart game and a golf game in which shots toward a target (goal) are made based on input information.

Patent Documents

Patent Document 1: JP2007-098032 A
Patent Document 2: JP2001-190840 A

SUMMARY OF INVENTION

In conventional fishing games, a player may decide where on a lake surface the player should cast a lure by checking the geography of a lake displayed in a screen, a fish radar displayed separately from the lake, etc.

However, it may be difficult for players who are unfamiliar with fishing or players who have never played fishing games to intuitively understand where on the lake surface he/she should make a cast in order to get a large fish based only on information of the geography and the fish radar, and thus those players have not been able to sufficiently enjoy the fishing games.

Also, in the situation where fishes are arranged sparsely in water when the game starts, if a lure does not reach a good position, no fish exists around the lure and the player can not make hits easily. Furthermore, even in the situation where the player knows the point where a large fish exists, if the player misses the point due to an input error he/she made when making a cast, the expectation that the player might get a large fish would fade away before the lure reaches the point.

One or more embodiments of the present invention may provide a game apparatus capable of allowing a player to play a game with feeling the player has never experienced.

One or more embodiments of the present invention are understood as, for example, a game apparatus, a game program and a recording medium recording the program described below. Specifically, a game apparatus according to an aspect of one or more embodiments of the present invention includes: an operation means operated by an operator in order to perform a game operation; a control means that controls a progress of a game by moving a first movable object from a reference position toward a target, the first movable object being set to be movable in a virtual space; and a storage means that stores target information for specifying information relating to a second movable object for each of a plurality of regions, the second movable object being set to be movable toward the first movable object, the plurality of regions being set for the target, wherein the control means executes: determination processing to determine, in response to an operation by the operator, an arrival position of the first movable object which has started the movement from the reference position; judgment processing to judge in which region of the plurality of regions the first movable object at the arrival position is located; specification processing to specify the information relating to the second movable object corresponding to the region in which the first movable object is located, with reference to the target information read from the storage means; and arrangement processing to arrange the second movable object in the virtual space based on the specified information relating to the second movable object. By generating and arranging the second movable object based on the arrival position of the first movable object, the player can maintain his/her expectation even after moving the first movable object toward the target.

Here, when judging that the arrival position of the first movable object is located in any of the regions, in the judgment processing, the control means may execute processing for changing the size of the target.

The information relating to the second movable object may include attribute information indicating at least one of a size, weight, score and capability value of the second movable object, the target information may include probability information comprising a plurality of selection probabilities for respective attributes, the selection probabilities being respectively associated with the regions, and the specification processing may refer to the probability information to specify the attribute of the second movable object based on the selection probability associated with the judged region.

The operation means may include a rotating element that is provided so as to be rotatable forward, backward, leftward and rightward, and the control means may receive signals indicating a rotation speed and a rotation angle of the rotating element from the operation means to execute processing to determine the arrival position of the first movable object.

The control means may receive from the operation means a signal for changing the reference position within a predetermined range and execute processing to determine a trajectory along which the first movable object moves based on the changed reference position.

The arrangement processing may arrange at least one second movable object in a certain region based on the arrival position or in each of predetermined regions set between the reference position and the arrival position, and the control means may executes: processing to select, upon a judgment that the first movable object approaches the arranged second movable object, the second movable object approached by the first movable object as a second movable object moving toward the first movable object; and processing to cancel, upon a judgment that the selected second movable object and the first movable object move away from each other, the selection of the second movable object.

According to an aspect of one or more embodiments of the present invention, a game program causes a computer to function as a game apparatus including: an operation means operated by an operator in order to perform a game operation; a control means that controls a progress of a game by moving a first movable object from a reference position toward a target, the first movable object being set to be movable in a virtual space; and a storage means that stores target information for specifying information relating to a second movable object for each of a plurality of regions, the second movable object being set to be movable toward the first movable object, the plurality of regions being set for the target, wherein the game program causes the control means to execute: determination processing to determine, in response to an operation by the operator, an arrival position of the first movable object which has started the movement from the reference position; judgment processing to judge in which region of the plurality of regions the first movable object at the arrival position is located; specification processing to specify the information relating to the second movable object corresponding to the region in which the first movable object is located, with reference to the target information read from the storage means; and arrangement processing to arrange the second movable object in the virtual space based on the specified information relating to the second movable object.

The game program may be recorded in a computer-readable recording medium.

One or more embodiments of the present invention are capable of providing a game apparatus which allows a player to play a game with feeling the player has never experienced.

DETAILED DESCRIPTION

Embodiments of the present invention will be described below with reference to the accompanying drawings. Note, however, that the following embodiments are merely illustrative, and are not intended to exclude various types of modifications and applications of techniques that will not be explicitly indicated below. In other words, the present invention may be implemented with various modifications without departing from the spirit of the present invention. In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

Figure 1:
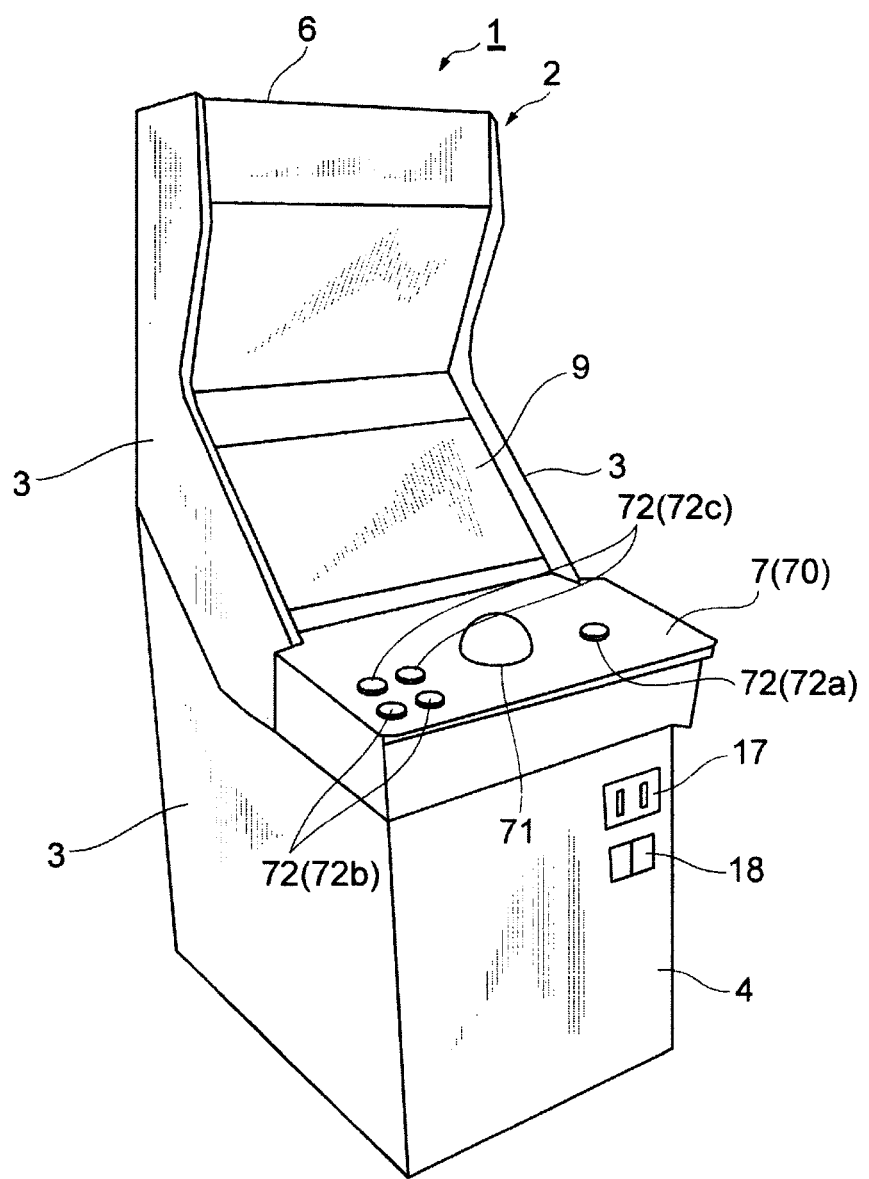
FIG. 1 is a perspective view schematically illustrating the appearance of a game apparatus according to one or more embodiments of the present invention.

FIG. 1 is a perspective view schematically illustrating the appearance of a game apparatus 1 according to one or more embodiments of the present invention. The game apparatus 1 illustrated in FIG. 1 includes a housing 2, and the housing 2 has a pair of right and left lateral plates 3, a front plate 4, a top plate 6, and a rear plate and a bottom plate which are omitted in FIG. 1. An operation table 7 allowing a player, being an operator of the game apparatus 1, to operate a game is provided so as to be horizontal to the bottom plate, on the front side in vertically central portions of both the lateral plates 3, and a display apparatus 9 is provided above the operation table 7 with a predetermined space therebetween.

The display apparatus 9 can display scenes according to the content of a game such as a fishing game. The scenes can be displayed as a virtual space which simulates the real world in two dimensions or three dimensions.

As illustrated in FIG. 1, slots 17 for coins and medals can be provided on the right side in a front surface of the front plate 4. A display device 18 for displaying the number of coins and medals inserted in the slots 17 may be provided below the slots 17. The slots 17 may receive bank bills.

Figure 2:
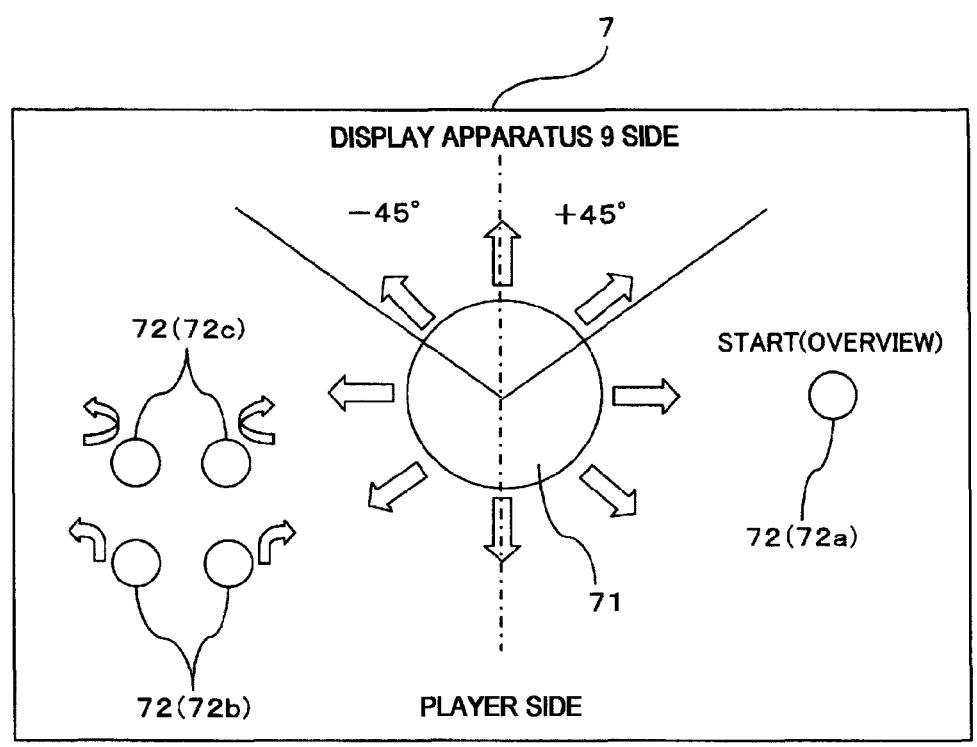
FIG. 2 is a schematic plan view of an operation table illustrated in FIG. 1.

The operation table 7 is provided with a game controller 71 and a button group 72 as illustrated in FIGS. 1 and 2. The game controller 71 and the button group 72 are used as an example of an operation part to be used by the player when operating the game. The game controller 71 may employ an input device, such as a trackball and a joystick, which allows signals according to the player's operation of the game to be input to the game apparatus 1. For fishing games, an input device modeling a fishing rod with a reel may be employed.

The button group 72 includes, for example, a start button 72a for starting the game. The player can start the game by, for example, inserting a predetermined number of coins or medals into the slot 17 and operating (e.g., pressing) the start button 72a.

The button group 72 may also include buttons 72b and buttons 72c used for controlling behaviors of a game character appearing on the game. Note that the arrangement of the game controller 71 and the button group 72 is appropriately determined. For example, the button group 72 may be arranged so as to surround the game controller 71.

After the game starts, the player can control the behaviors of the game character in a game display screen on the display apparatus 9 by operating the game controller 71 and the button group 72.

A control apparatus 70 for controlling the overall operation (e.g., start, progress, end, etc., of the game) of the game apparatus 1 can be, for example, built in the operation table 7. The operation table 7 may be fixedly installed in the housing 2 of the game apparatus 1, or may be removably installed. If the operation table 7 is removable, the same game can be played on another game apparatus by installing the operation table 7 therein.

The following description will describe the control apparatus 70 capable of causing the game apparatus 1 to function as a fishing game apparatus.

(Outline of Fishing Game)

Although there are various types of fishing games, a lure fishing game in which fishes such as basses are caught using a lure will be described as an example. For example, by rendering, in the virtual space, characters and objects (data) each simulating a landscape of a fishing spot such as a lake, an angler, a fishing boat used by the angler, fishing tackles (such as a fishing rod, a reel and a lure), fishes in the water, etc., scenes of the fishing game which allows a player to simulate fishing in the real world can be reproduced.

The display apparatus 9 can display an image of the virtual space viewed from a virtual viewpoint (camera) set in the virtual space, and display the virtual space within the field of view of the camera, for which a viewing direction has been set so as to capture the landscape of the fishing spot including a character operated by the player (e.g., an angler) (hereinafter, sometimes referred to as a "virtual fishing spot").

Figure 10:
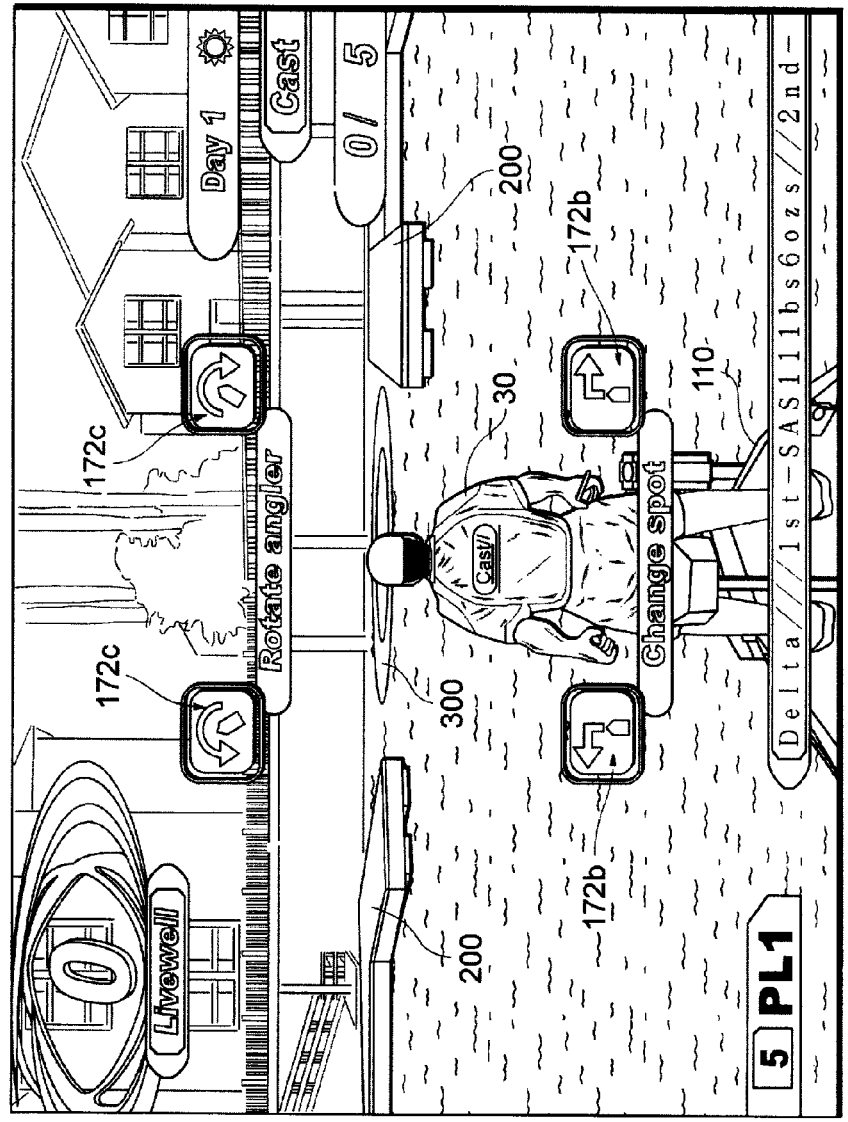
FIG. 10 is a diagram depicting an example of a display screen of the fishing game according to one or more embodiments of the present invention.

FIG. 10 depicts an example of display screens. FIG. 10 illustrates an aspect in which a landscape of a fishing spot including an angler (character) 30 boarding on a fishing boat (character) 110 and two piers (characters) located in front of the angler 30 is displayed. In this display screen, a target 300 having regions (layers) defined by a plurality of concentric circles is displayed on a water surface between the two piers 200. The target 300 clearly indicates a point (casting point) where the angler 30 operated by the player should cast a lure. The target 300 will be described later in detail.

The camera is provided with parameters such as coordinates (X, Y and Z coordinates) of a current position and coordinates (X, Y and Z coordinates) of a viewing direction in the virtual space. By changing the parameters of this camera, the viewing direction and field of view of the virtual camera are changed.

The camera can be set at, for example, a position behind the angler with a predetermined distance therebetween in the virtual space. By setting the camera above the line of sight of the angler, the display apparatus 9 can display a bird's eye view. The switching of a view to the bird's eye view may be configured to be performed by, for example, pressing the start button 72a during the progress of the game. The player can re-display the original screen before the switching by pressing the start button 72a again in the state where the bird's eye view is being displayed.

Figure 11:
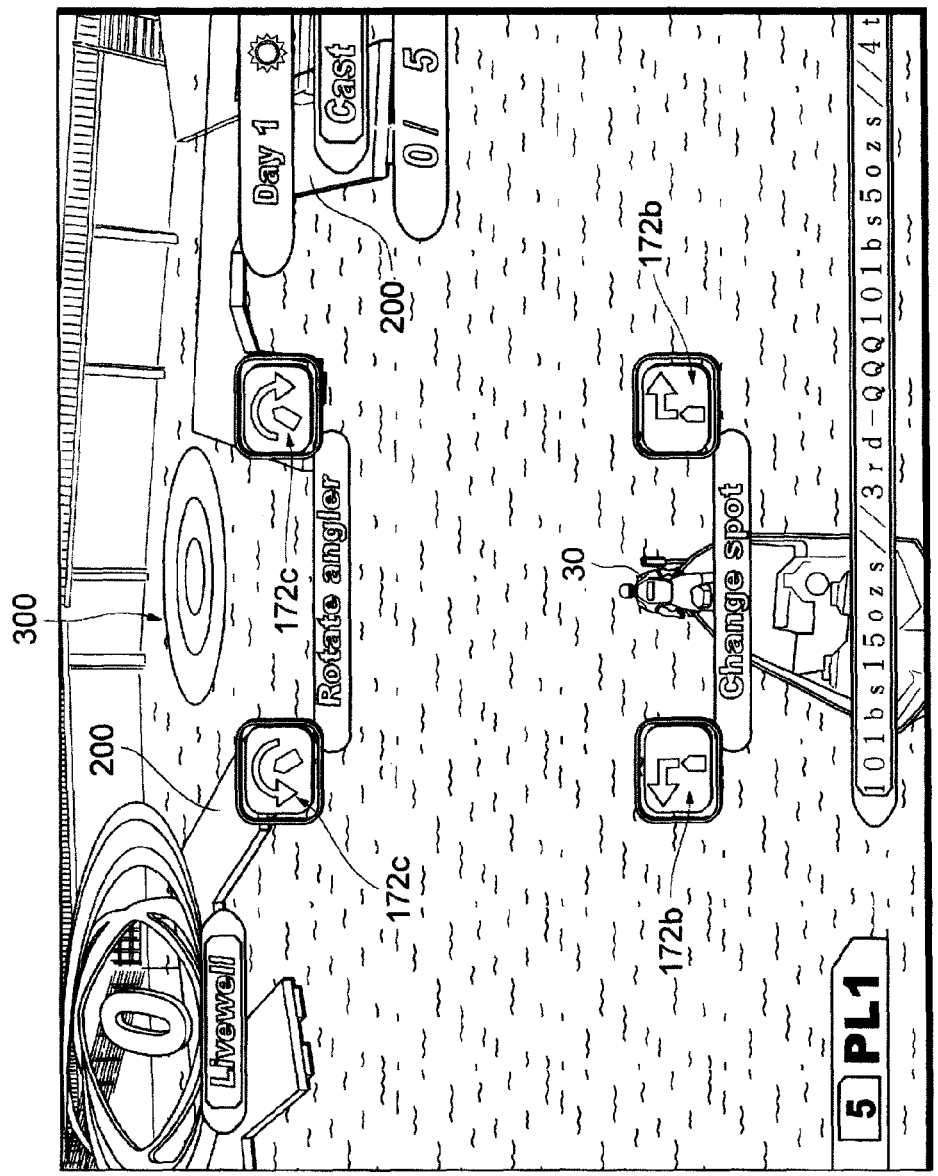
FIG. 11 is a diagram depicting an example of a display screen (bird's eye view) of the fishing game according to one or more embodiments of the present invention.

FIG. 11 is an example of a display screen of the bird's eye view. The display screen illustrated in FIG. 11 depicts an example where the view has been switched from the display screen illustrated in FIG. 10. The player can check, for example, the position of the target 300 by appropriately switching the views during the progress of the game. The player can change the orientation of the angler 30 (fishing boat 110) and move the angler 30 (fishing boat 110) toward the target 300, as appropriate.

The player can change the orientation of the angler 30 (fishing boat 110) in the right-and-left direction in the game display screen by, for example, the two buttons 72c in the button group 72. In accordance with this change, the viewing direction of the camera can also be changed. Also, the player can move the angler 30 in the right-and-left direction, etc. in the virtual fishing spot by operating the other two buttons 72b. In the situation where the angler 30 is on the fishing boat 110 as described above, these operations can change the orientation of the fishing boat 110 and can move the fishing boat 110 on the water surface.

Note that, as indicated by reference symbols 172c and 172d in FIGS. 10 and 11, the game display screens may also display marks and the like which indicate the above operations to the player. For example, displaying marks same as or similar to the marks provided to or in the vicinity of the buttons 72c, as indicated with the reference symbols 172c, can indicate the player that the orientation of the angler 30 (fishing boat 110) can be changed by the buttons 72c. In the same way, displaying marks same as or similar to the marks provided to or in the vicinity of the buttons 72b, as indicated with the reference symbols 172b, can indicate the player that the position of the angler 30 (fishing boat 110) can be moved in the right-and-left direction by the buttons 72b.

The angler 30 can be set so as to use one or more lures. In the setting where the angler 30 has a plurality of lures, a lure to be used can be selected by, for example, rotating the trackball, being an example of the game controller 71 rightward and leftward. The trackball 71 is an example of a rotating element provided so as to be rotatable in any direction, e.g., forward, backward, leftward and rightward, as illustrated in FIG. 2. In this example, a rotation toward the display apparatus 9 is referred to as a forward rotation, a rotation in a direction opposite to the forward direction (toward the player) is referred to as a backward rotation, a rotation to the right in the paper plane of FIG. 2 is referred to as a rightward rotation, and a rotation in a direction opposite to the rightward direction is referred to as a leftward rotation.

Selectable lures may include, for example, a topwater lure, a floating lure, a suspending lure and a sinking lure. The lure can be selected based on factors such as season, weather and time reproduced in the virtual fishing spot. This selection may be automatically made.

The season, weather and time in the virtual fishing spot can be expressed by, for example, changing the color of a background image (texture) or by changing the clothes and possessions of the angler character displayed in the screen. The weather such as sunny, rainy and cloudy, and/or time such as morning, noon and evening can also be expressed in the same way.

In order to cause the angler to cast the lure in the virtual fishing spot, for example, the player rotates the trackball 71 toward the display apparatus 9 (makes the forward rotation).

The casting direction can be changed by shifting the rotation direction of the trackball 71 obliquely rightward and leftward.

When the lure is cast, the display apparatus 9 can display a motion picture which follows the lure from behind until the lure reaches the water surface. The motion picture is constituted by images which are successively generated and displayed on the display apparatus 9, the images including the lure seen from a virtual viewpoint (camera) arranged between the angler and a reaching point of the lure, where the line of sight is set in a direction from the angler to the reaching point.

Figure 12:
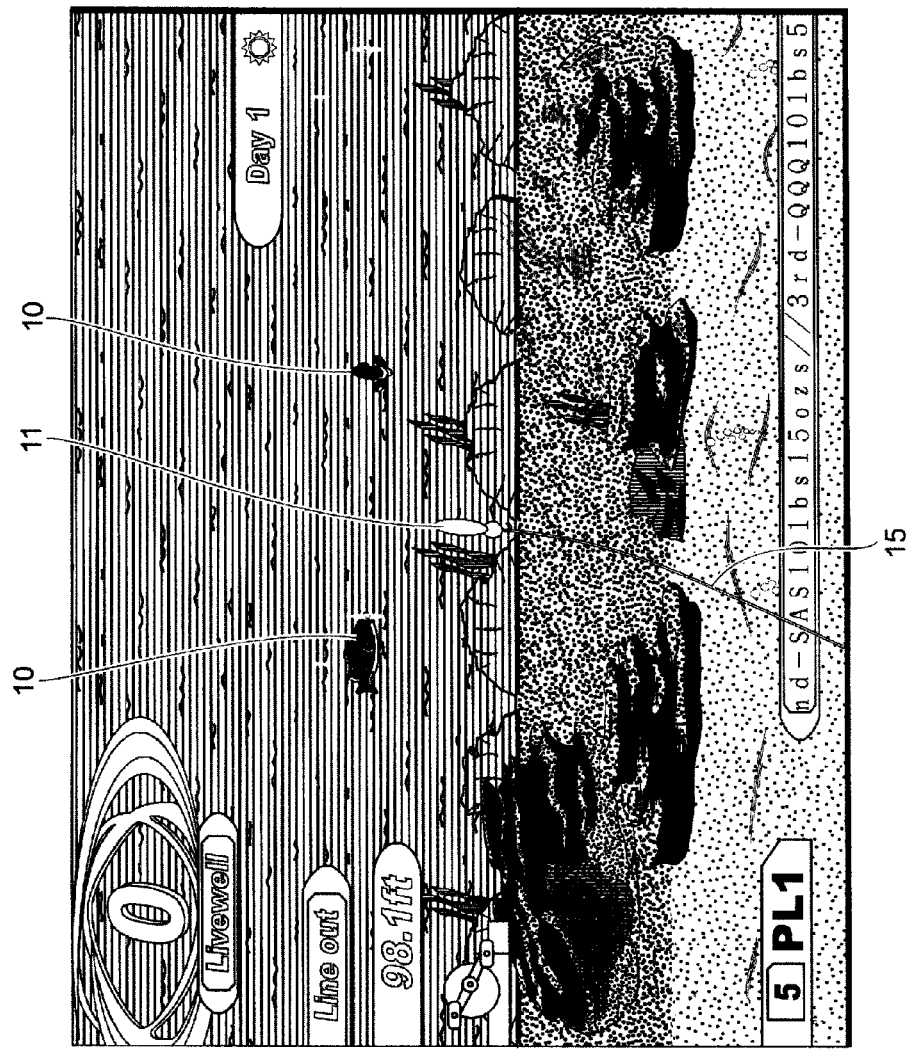
FIG. 12 is a diagram depicting an example of a display screen (underwater view) of the fishing game according to one or more embodiments of the present invention.

When the lure reaches the water surface in the virtual fishing spot, an underwater motion picture including the lure can be displayed on the display apparatus 9 as a motion picture within the field of view of the camera. Accordingly, the player can visually check the condition of underwater (e.g., the behavior of the lure, the presence/absence of fishes around the lure, etc.) on the display apparatus 9. An example of such a display screen is depicted in FIG. 12. FIG. 12 illustrates an aspect in which the lure 11 and a fishing line (line) 15 are displayed as a motion picture captured by the camera, and two fishes (characters) 10 exist at the back of the screen. The player can perform operations such as an operation of retrieving the reel (fishing line 15), an operation of providing a motion (lure action) to the lure 11 proceeding in the water and a hooking operation when a fish 10 bites the lure 11, while visually checking the condition of underwater as described above.

The types of the sizes (weights) of fishes appearing during the progress of the game may include, for example, the Non-Keeper, Keeper, Lunker, Hawg and Trophy, in the ascending order of size (weight). The Trophy represents the size of a fish like a spirit of the lake, etc., which can only be caught with a high level of technique. Note that the sizes (weights) of fishes may be simplified to, for example, "large, middle and small."

In such a fishing game, the player may determine which position (point) on the water surface to cast the lure by checking the geography of a fishing spot (e.g., a lake) displayed on the display apparatus 9, a fish radar displayed separately from the lake, etc.

However, it may be difficult for players who are unfamiliar with fishing or players who have never played fishing games to intuitively understand where on the lake surface he/she should makes a cast in order to get a large fish based only on information obtained from the geography, the fish radar, etc.

In one or more embodiments of the present invention, the position where a large fish exists with a high probability is displayed in the screen as the "target 300," to clearly indicate the player the position where the player should cast the lure 11 while checking the "target 300." With such a configuration, the player can intuitively understand where in the virtual space a specific movable object (e.g., a fish with a large size) exists.

Also, in order to allow the player to maintain his/her expectation for a large fish even when the player casts the lure to the outside of the "target 300," the size (weight) of a fish to be generated in the vicinity of the lure 11 when the lure 11 reaches the water surface is decided by lottery using random numbers and a lottery table.

In addition, by changing (e.g., reducing) the size of the "target 300" when the lure is cast to the "target 300," difficulty levels are provided to the game play, so that even an advanced-level player of fishing games will not be bored with this game.

It is possible to make settings in which a higher point is given to a larger fish in fishing games. However, in a fishing game where the number of casts is fixed, it is desired that a player is provided with a range of choice for fishes to be hit, such that the player can hit a larger fish with a higher priority while avoiding hitting a smaller fish.

However, if a plurality of fishes are generated based on the position ("target 300") where the lure 11 has been cast 11, the number of fishes to be generated is limited due to a load on rendering processing, and the number of fishes displayed in the screen which a player can recognize is also limited.

In light of such circumstances, in the fishing game of this example, a plurality of fishes are arranged in a predetermined region under a predetermined condition, and fishes which make a reaction of biting the lure are limited to fishes which appear within the current field of view (display screen) of the virtual viewpoint set in the virtual space, and when the distance between the lure and a fish exceeds a certain distance or when a certain time period has elapsed after a fish makes the reaction of biting the lure, that fish gives up biting the lure, and then another fish which enters the field of view will make the reaction of biting the lure.

Such a configuration enables the player to, when the fish making the reaction of biting the lure is small, intentionally increasing the speed of retrieving the reel (line) to separate the lure away from the fish and avoid the lure from being bit by the small fish, and then to cause a large fish to bite the lure. Accordingly, a wide range of choice for fishes to be hit can be provided to the player.

(Implementation Example of Control Apparatus 70)

A part of or all of the functions of the fishing game apparatus 1 described above are implemented as a result of the execution of a predetermined application program (fishing game program) by a computer, such as a CPU, incorporated in the control apparatus 70.

The game program can be provided in the form of being recorded in a computer-readable recording medium such as a flexible disk, a CD-ROM, a CD-R, a CD-RW, a MO and a DVD. In this case, the computer reads the game program from the recording medium and transferred to and stored in an internal storage apparatus and/or an external storage apparatus for use. Examples of the storage apparatuses include a memory such as a RAM, a hard disk drive, a magneto-optical disk and the like.

Alternatively, the game program may be recorded in a storage apparatus or a storage medium such as a RAM, a hard disk drive, a magnetic disk, an optical disk and a magneto-optical disk, and the game program may then be provided from such a storage apparatus or storage medium to the computer via a communication line such as the Internet.

In this context, the computer represents a concept including hardware and an operating system (OS), and the computer may indicate hardware which operates under the control of an OS. Also, in the case where the program on its own can operate the hardware without requiring the OS, the hardware may be considered as the computer. The hardware may include a processing apparatus such as a CPU and a reading apparatus capable of reading a program recorded in a recording medium.

The game program contains program codes which cause the above-described computer to implement functions as the game apparatus 1. Also, a part of the functions may be implemented by the OS instead of being implemented by the program.

In addition, the recording medium may employ various types of computer-readable media such as an IC card, a ROM cartridge, a magnetic tape, a punched card, an internal storage apparatus of the computer (a memory such as a RAM and a ROM), an external storage apparatus, and a printed matter including codes such as bar codes printed thereon, in addition to the flexible disk, CD-ROM, CD-R, CD-RW, DVD, magnet disk, optical disk and magneto-optical disk.

(Configuration Example of Control Apparatus 70)

Figure 3:
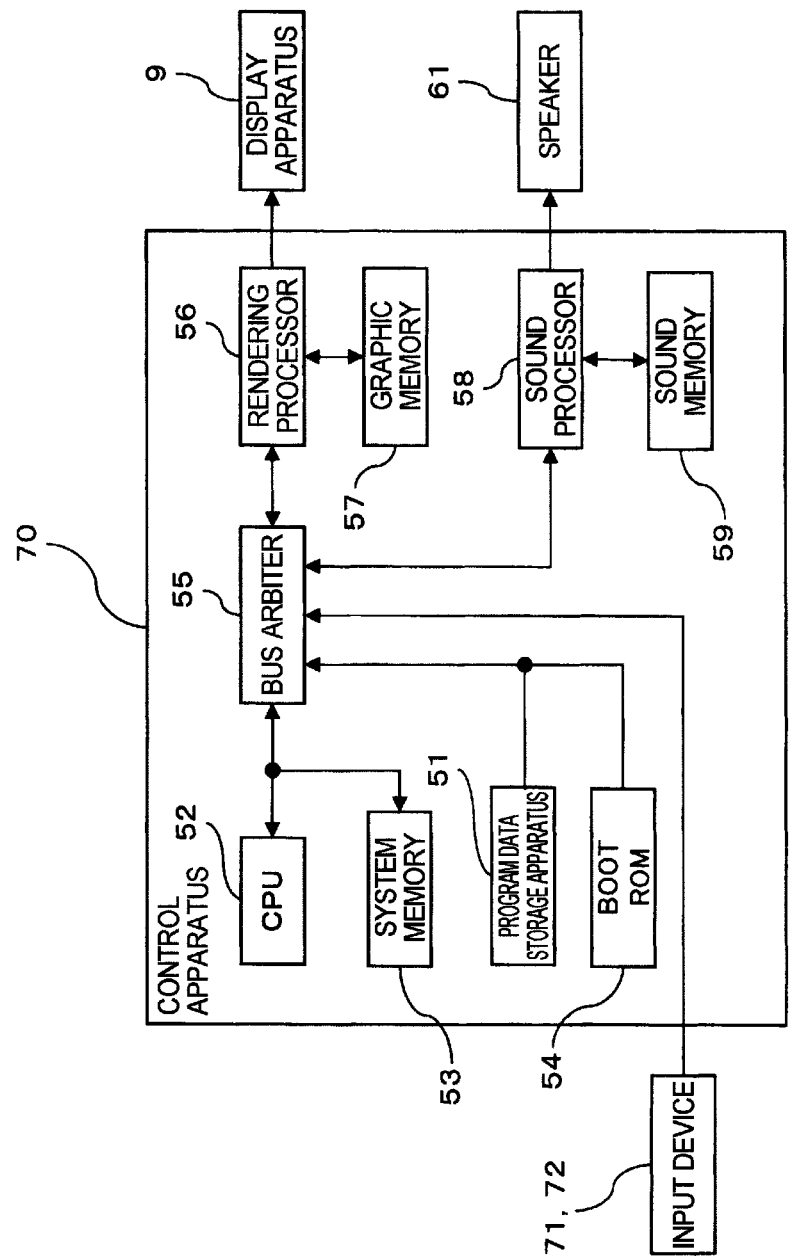
FIG. 3 is a block diagram depicting a configuration example of a control apparatus according to one or more embodiments of the present invention.

FIG. 3 depicts a configuration example of the control apparatus 70 of one or more embodiments of the present invention. The control apparatus 70 depicted in FIG. 3 includes, for example, a program data storage apparatus 51, a CPU 52, a system memory 53, a boot ROM 54, a bus arbiter 55, a rendering processor 56, a graphic memory 57, a sound processor 58 and a sound memory 59. These elements are communicatively connected to each other via, for example, a bus line.

The program data storage apparatus (storage means) 51 stores an application program (fishing game program) which causes the game apparatus 1 to function as a fishing game apparatus. The storage apparatus 51 may employ, for example, a ROM, a RAM, a hard disk drive, an optical disk drive, or the like. The storage apparatus 51 may also store a game execution program for executing flowcharts illustrated in FIGS. 7 to 9, data such as an image (still image and/or moving image) and sound used for expressing the fishing game.

The CPU (control means) 52 reads the fishing game program from the storage apparatus 51, executes the fishing game program, and controls the entire operation of the fishing game. This control includes the calculation of coordinates for displaying images in the fishing game, etc.

The system memory 53 stores, for example, a program and data used for processing by the CPU 52.

The boot ROM 54 stores a program and data used for booting the game apparatus 1.

The bus arbiter 55 controls a flow of signals and data input from each block of the game apparatus 1 and the input devices including the game controller 71 and the button group 72 to arbitrate collision between signals and data pieces on the bus line.

The rendering processor 56 transmits image data read from the program data storage apparatus 51, a signal according to the game operation of the player, image data to be rendered in accordance with the progress of the game, etc., to the display apparatus 9, and displays the image according to the progress of the game on the display apparatus 9 The rendering processor 56 may be used as an example of an image generating means which sets a virtual viewpoint corresponding to the viewpoint of the virtual camera in the virtual space, and generates an image of the virtual space seen from the virtual viewpoint (camera).

The image data includes image data pieces each simulating, for example, the angler 30 operated by the player, the fishing boat 110 used by the angler 30, the fishing tackles (such as the fishing rod, the reel and the lure 11) and fishes in the water. They are characters (movable objects) movable in the virtual space, and the image data pieces thereof may be configured as polygon data pieces. In addition, the image data pieces also include marks such as a casting point rendered on the water surface (the target 300 for casting) and arrows which allow the player to expect hooking operation (e.g., the rotation direction of the trackball 71) when the fish bites the lure 11.

The angler (character) 30 can be associated with parameters as needed, the parameters including the length of the fishing line (line) 15 of the reel, the current position (coordinates) of the angler character 30 in the virtual space, the current position (coordinates) of the lure 11, the casting direction the lure 11 and the types of lures 11 in possession (available). Note that the lure 11 is an example of a first movable object set to be movable in the virtual space in this example.

The position of the angler character 30 may simply be the same as the position of the fishing boat 110. Also, the position of the lure 11 may also vary due to a preliminary operation of lure casting, e.g., back swing. In addition, the casting direction of the lure 11 may be determined based on the direction of the back swing.

The fish (character) can be associated with parameters such as, for example, a current position (coordinates), a biting flag for controlling whether or not the fish bites the lure 11, and the region where the biting flag is set to ON. The region where the biting flag is set to ON indicates a region in which the fish makes the reaction of biting the lure when the lure 11 enters the region (hereinafter referred to as the "reaction region" or "coverage"). Note that this reaction region may be set in a predetermined range from the position where the fish is arranged and set as, for example, a region defined by a sphere, a cube or a rectangular parallelepiped. In the case of sphere, the reaction region may be expressed by the central coordinates and the radius, while in the case of cube or rectangular parallelepiped, the reaction region may be expressed by the coordinates of respective vertices.

Also, the fish (character) can be associated with information indicative of attributes of the fish (attribute information) as an example of information relating to the fish. Examples of the attribute information may include, at least one of the size, weight, score, and capability value. Note that the capability value is information indicative of, for example, the fastness of fish (moving speed), pulling force (pulling strength), physical energy, smartness, etc., without limiting thereto. Accordingly, a small fish having strong pulling force or a smart fish can be set, which can improve the amusingness of the game.

Based on such attribute information of the fish, the fish character can also be associated with the number of times of execution of a fighting mode (described later) in accordance with the pulling strength or the degree of wild motion when the fish has bit the lure 11. Note that when the fish character with its biting flag ON is controlled so as to follow the lure 11 within the associated coverage and bite the lure 11. The attribute information may vary depending on the type of the lure 11.

A plurality of targets (areas) 300 indicating the casting point may be set on the water surface in the virtual space. The targets 300 may have any shape. The targets 300 may have a circular shape or a polygonal shape such as a triangular or a quadrangular shape. Some of the targets 300 may move on the water surface. In such a case, the movement of the target 300 can be controlled by associating, as needed, the target 300 with a movement flag defining whether or not the movement is allowed or parameters such as moving direction, moving speed and moving range. The size of the movable target 300 may differ from that of the fixed target 300. For example, the movable target 300 may be set to larger than the fixed target 300 so that the lure 11 can hit the movable target 300 easily.

The number of targets 300 may be set so as to increase or decrease in accordance with the progress of the game. Also, a target 300 which is very small in size may be set in the virtual space so that only a player having a high lure-casting skill can hit it. Such a target 300 can be associated with a parameter for which a giant fish, being the spirit of a lake, etc., like the Trophy mentioned above, with a high probability.

Figure 4:
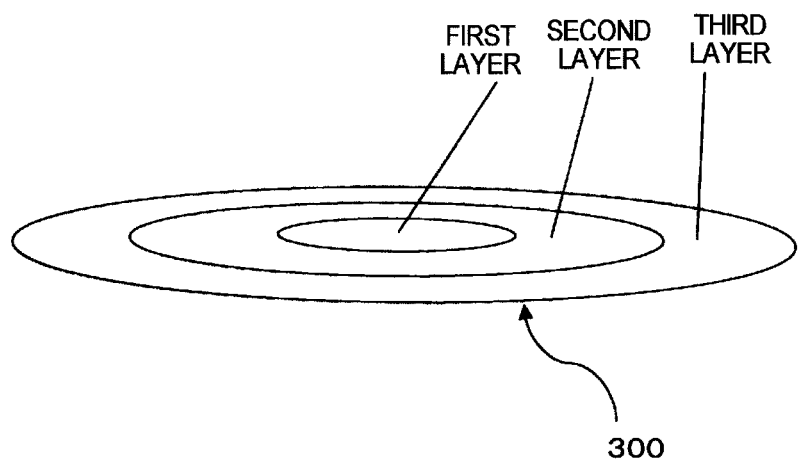
FIG. 4 is a schematic diagram depicting a configuration example of a target according to one or more embodiments of the present invention.

FIG. 4 illustrates an example of the target 300. The target 300 depicted in FIG. 4 is provided with a plurality of regions (layers) defined by a plurality of (three) (concentric) circles. In this case, the region of each layer can be specified by parameters such as the central coordinates and a distance from the central coordinates (radius). For example, the radius r1 of a first region can be set to r1=r, the radius r2 of a second region can be set to r2=2×r, and the radius r3 of a third region can be set to r3=3×r. It may be only necessary to meet the condition of r1<r2<r3.

Also, the attributes such as the size of the fish to be arranged in the field of view of the camera in the water may be changed based on which layer the lure 11 reaches, i.e., a region in which the reaching point of the lure 11 is located. In other words, the attributes of the fish can be changed based on a distance from the central coordinates of the target 300 to the coordinates of the reaching point of the lure 11.

For example, a configuration in which a fish with a larger size is arranged in the case where the lure reaches a layer with a smaller radius may be employed. In the case where a plurality of fishes are to be arranged in the field of view of the camera, a configuration in which fishes with a large size are arranged with a higher probability when the lure 11 reaches a layer with a smaller radius.

The following Table 1 indicates an example. Data in a table form illustrated below is an example of data in which the layers in the target and the region outside the target are each associated with selection probability of a certain attribute detail, such as the size or weight, of a fish to be arranged in each regions (fish arrangement lottery table).

TABLE 1

Fish Arrangement Lottery Table

|  | Large | Middle | Small |
| --- | --- | --- | --- |
| First layer | 70% | 20% | 10% |
| Second layer | 50% | 30% | 20% |
| Third layer | 20% | 50% | 30% |
| Outside of target | 10% | 20% | 70% |

Table 1 illustrates that, when it is judged that the lure 11 reaches the first layer, a fish with a large, middle and small size (the size being one of parameters indicating the attributes of the fish) is arranged in the field of view with probabilities of 70%, 20% and 10%, respectively. In the same way, a fish with the respective attributes (sizes) can be specified and arranged in the field of view with probabilities of 50%, 30% and 20%, respectively, when it is judged that the lure 11 reaches the second layer, and with probabilities of 20%, 50% and 30%, respectively, when it is judged that the lure 11 reaches the third layer. When it is judged that the lure 11 reaches the region outside the target, a fish with the respective attributes (sizes) can be arranged in the field of view with probabilities of, for example, 10%, 20% and 70%, respectively.

In short, the fish arrangement lottery table includes a plurality of regions which are set for the target 300 and is used as an example of information (target information or specification information) for specifying, for each of the regions, information relating to the fish (such as large, middle and small in size) which is set so as to be movable toward the lure 11, and the fish arrangement lottery table includes probability information having selection probabilities of the respective attribute details of the fish, the probabilities being associated with the respective regions of the target 300.

Note that, although this example describes a case where the attribute detail of fish associated with each region is the "size", the attribute detail may be one of the weight, score and capability value (fastness (the moving speed), pulling force (pulling strength), physical energy, smartness, etc.), or a combination of one of the above and the "size."

The CPU 52 can refer to the above-described probability information and specify, based on the probabilities associated with the region which has been judged as including the reaching point of the lure 11, the attribute of the fish corresponding to the region including the reaching point of the lure 11.

Such a configuration can produce the situation where a fish having a specific attribute, such as a large fish, can be caught with a high probability in a certain region (layer) in the virtual space. In addition, such a configuration allows the player to expect that a large fish might appear even when the player misses the target 300.

Note that a plurality of fish-appearing tables including "large, large, middle and small" may be associated in advance with each of the layers in the target and the region outside the target. With such a configuration, by selecting any one of the fish-appearing tables by lottery (random numbers) and referring to the selected table, the arrangement pattern of fishes as of when the lure reaches the water surface can be changed. In addition, the probability of arrangement of fish for each layer may be changed based on one of or a combination of a time zone, weather and season of the virtual fishing spot, and the type of the lure 11.

The table described above can be stored in, for example, the storage apparatus 51. The CPU 52 can specify the region which the lure 11 has reached by comparing the coordinates of the point which the lure 11 has reached with the coordinates of the regions inside (layers) or outside the target in the virtual space, and cause the rendering processor 56 to arrange (render) a plurality of fishes of different sizes in the field of view in accordance with the probabilities corresponding to the reaching point.

The size of the target 300, which the lure reaches, i.e., the target 300 judged to have a layer in which the reaching point of the lure 11 is located may be changed. For example, in the above example, when it is judged that the lure has reached the first layer, the CPU 52 can delete the first layer from the display screen and change the radii of the remaining second and third layers, thereby re-setting the second layer and the third layer as the first layer and second layer, respectively.

In other words, when the lure 11 reaches the first layer, being the central layer, the three-layered target is downsized to the two-layered target. In the case of the three-layered target 300, if the lure reaches any of the layers three times, the target 300 would disappear. The probabilities concerning the weights of fish to be associated with the new layers after the downsizing of the target 300 may remain unchanged from the probabilities which were associated with the layers before the downsizing. For example, if the lure reaches the first layer, entries for the first layer in the fish arrangement lottery table illustrated in Table 1 will be deleted, and entries for the second and third layers will be shifted to entries for the first and second layers, respectively.

Such a condition can avoid a situation where the first layer, being the central layer, is fixed in a state in which fishes having a specific attribute are highly likely to be arranged. In other words, it is possible to make it more difficult to arrange a fish having a specific attribute, such as a large fish, if the lure reaches the central layer several times. In short, such a configuration can produce a point where the fish gets used to the lure and become less reactive to the lure, i.e., where the fish has had lockjaw. Accordingly, the fishing game can be provided with amusement in which the angler can be motivated to aim at different points (targets) 300, instead of aiming at the same point (target) 300, and thus the player will not be bored with the game.

The above-described control can be performed by, for example, associating a flag (hit flag) indicating whether or not the lure has reached with each layer.

The graphic memory 57 stores graphic data and the like used by the rendering processor 56 to generate images.

The sound processor 58 transmits to a speaker 61 sound data read from the program data storage apparatus 51, a signal according to the game operation of the player and sound data to be generated in accordance with the progress of the game, and generates sound from the speaker 61.

The control apparatus 70 may be provided with an interface to the Internet, LAN and the like (not depicted), so that the control apparatus 70 can communicate with a control apparatus 70 in another game apparatus 1 or a network server via the interface. Accordingly, a plurality of players may play the game against each other in the same game apparatus 1, or players may also play the game against each other via the network.

The input device may include, in addition to the trackball 71 and the button group 72, a detector for detecting a coin or a medal inserted in the slot 17, and discrete detectors or a common detector for detecting the operations of the buttons and detecting the rotation amount, rotation angle (e.g., 0-180 degrees), rotation speed (e.g., a value normalized in the range of 0-1) and the like of the trackball 71. The input device inputs to the control apparatus 70 detection signals from these detectors as game operation signals.

(Description of Operation)

Next, an example of the operation of the fishing game provided by the game apparatus 1 (control apparatus 70) of one or more embodiments of the present invention will be described with reference to the flowcharts illustrated in FIGS. 7 to 9.

Figure 7:
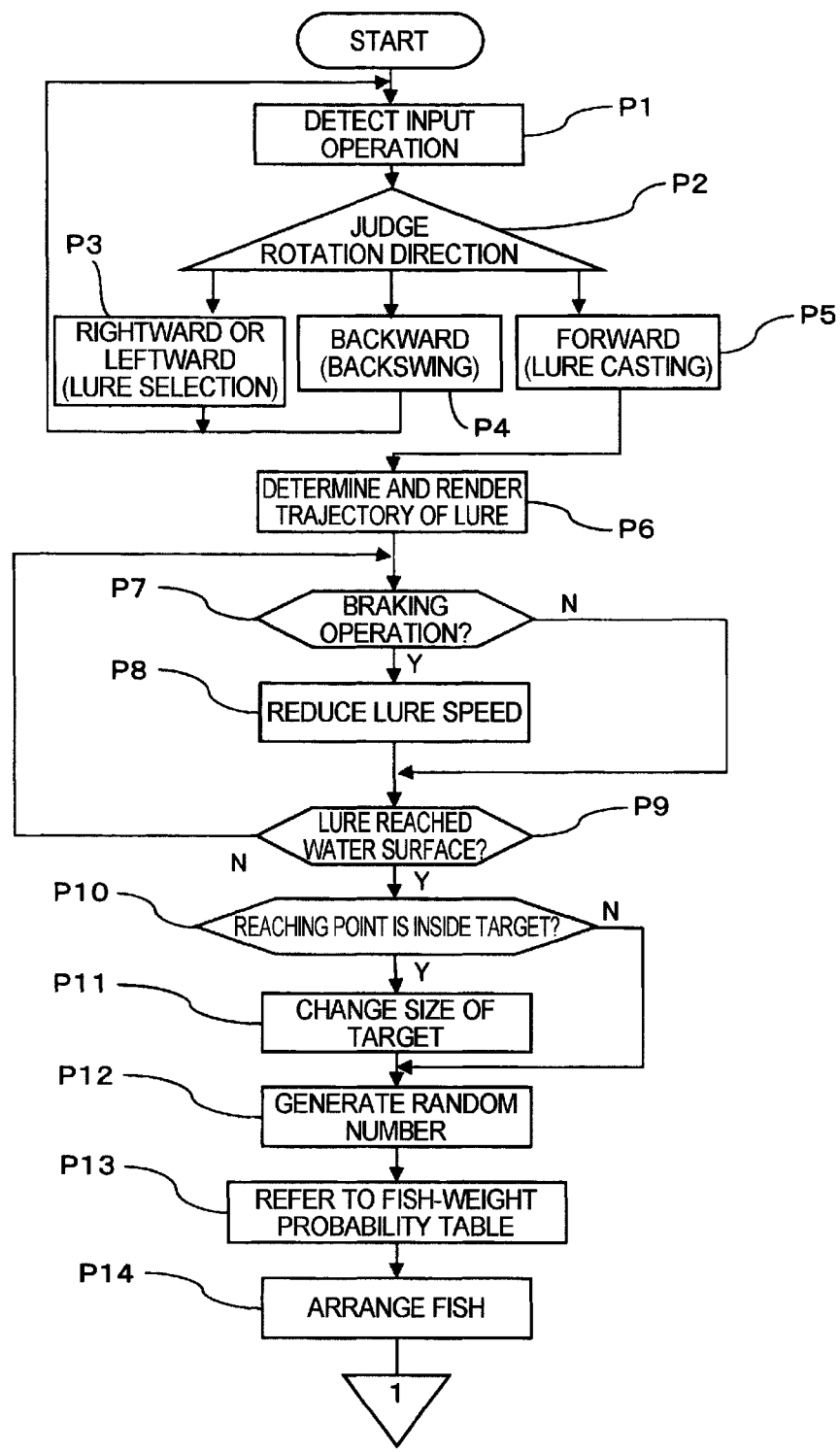
FIG. 7 is a flowchart explaining operations of the fishing game according to one or more embodiments of the present invention.
Figure 8:
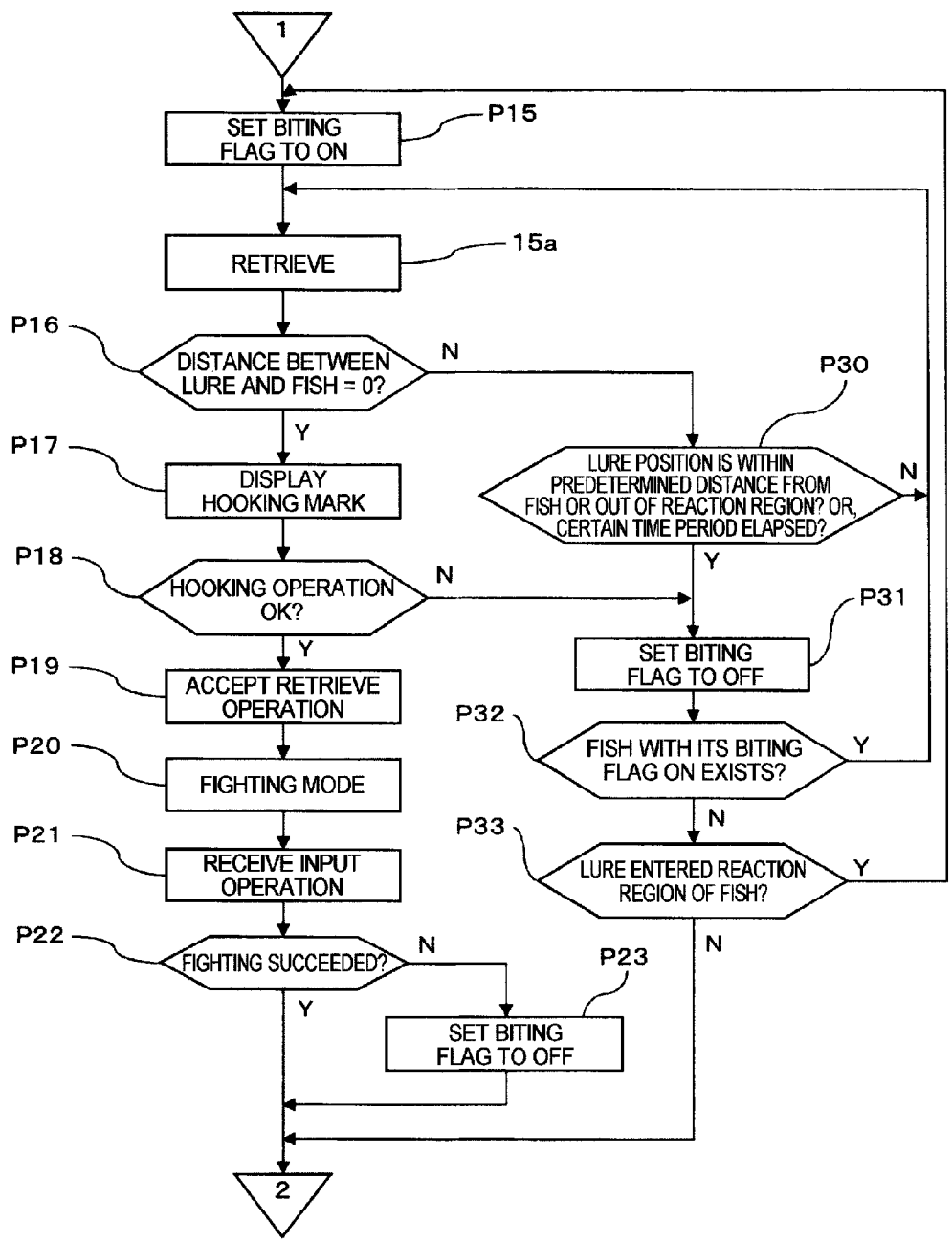
FIG. 8 is a flowchart explaining operations of the fishing game according to one or more embodiments of the present invention.

As depicted in FIG. 7, when the game starts, the control apparatus 70 detects signals of a rotation speed and a rotation angle which are input as a result of a player's operation of the trackball 71 (processing P1), and based on the detection results, the CPU 52 judges which operation—the selection of a lure 11, the backswing or the casting of the lure 11—the above operation corresponds to (processing P2).

For example, the CPU 52 can judge that the operation corresponds to an instruction of selecting a lure 11 if the input is made by a rightward or leftward rotation, an instruction of backswing when the input is made by a backward rotation, and an instruction of lure casting when the input is made by a forward rotation, respectively (processing P3, P4 and P5). Here, a starting point (reference position) and a casting angle of the lure can be determined based on the type of backswing.

Note that the lure 11 may also be cast without backswing. In such a case, the starting point of the lure 11 may be proximately set at the position of the angler, and the casting angle may be a predetermined angle. Accordingly, even when a player unfamiliar with operations of the game, such as a beginner and a child, simply rotates the trackball 71 forward, the player can cast the lure and can in any way catch some sort of fishes, as will be described below.

The types of backswing may be configured to vary depending on cast methods. Examples of the cast methods may include overhead cast, backhand cast, side-arm cast and pitching cast.

For example, the backswing for the overhead cast is made by an operation in which the fishing rod is tilted at right behind the angler character 30. The backswing for the backhand cast is made by an operation in which the fishing rod is moved backward left of the angler character 30. The backswing for the side-arm cast is made by an operation in which the fishing rod is moved to the right of the angler character 30. The backswing for the pitching cast is made by an operation in which the lure 11 is moved downward like a pendulum.

The CPU 52 can detect a difference in these operations using a difference in the rotation directions of the trackball 71 in order to detect the type of backswing, and causes the rendering processor 56 to render an operation of the angler character 30 corresponding to the detected backswing on the display apparatus 9. In other words, the CPU 52 can receive from the trackball 71 a signal for changing the reference position of the lure 11 within a predetermined range in accordance with the cast method.

With such a configuration, the player can select an appropriate cast method to perform lure casting by taking into consideration a trajectory of the lure 11, which is appropriate for avoiding obstacles such as a roof, driftwood and piers existing on the water surface in the virtual space. Accordingly, the amusement of the game can be improved.

The length of backswing may also be controlled by judging a difference in the amount of backward rotation of the trackball 71, in such a way that the trajectory of the lure 11 will be set to low when short backswing is made, while the trajectory of the lure 11 will be set to high when long backswing is made.

On the other hand, forward swing may not vary depending on the cast method, and the casting direction such as leftward, forward and rightward can be determined based on the rotation direction of the trackball 71. Casting directions in the pitching cast may be fixed to forward, regardless of a difference in the rotation direction of the trackball 71.

Note that, the rotation direction of the trackball 71 can be represented by a shift angle with respect to a line passing through the center of a circle, defined by the trackball 71 as seen from the above, and extending toward the display apparatus 9. The casting direction can be determined based on the shift angle. Also, forward cast may be configured to be effective when the rotation direction of the trackball 71 is within a predetermined shift angle (e.g., +/−45 degrees).

When it is judged that operation input of the tracking ball 71 is a forward rotation input, the CPU 52 receives signals indicative of the rotation speed and rotation angle of the trackball 71, determines the trajectory (movement passage) and the reaching point (arrival position) of the lure 11 from the starting point (reference position) of the lure 11, and causes the rendering processor 56 to display a cast scene along the trajectory of the lure 11 on the display apparatus 9 (processing P6).

The trajectory of the lure is determined by, for example, a calculation which takes into account the rotation direction (e.g., within +/−45 degrees) and rotation speed of the trackball 71, the type of backswing (the reference position of the lure 11 which has been changed as described above), and acceleration of gravity. In a case where wind is generated in the virtual space in accordance with the season, weather and time zone, the trajectory of the lure 11 may also be calculated by taking into account the effect of the wind (e.g., the speed, direction, etc., of the wind).

The CPU 52 then monitors whether or not an input of backward rotation of the trackball 71 or an input of rotation stop of the coasting trackball 71 is detected until the cast lure 11 reaches the water surface (route N in processing P7).

If the input of backward rotation or rotation stop is detected, the CPU 52 performs display control so as to reduce the moving speed (braking) of the lure 11, and determines the reaching point again (processing P8). In other words, the player can express a so-called thumbing in the virtual space by rotating the trackball 71 backward or stopping the trackball 71 after lure casting. Accordingly, the flight distance of the cast lure 11 can be adjusted.

By configuring the reaching point of the lure 11 to be determined based on the operation input of the trackball 71, casting skills depending on the player's skill of operating the trackball 71 can be produced, which enhances the amusement of the game.

After the lure 11 is cast, when judging that the lure 11 reaches the water surface, the CPU 52 searches for a target 300 in the vicinity of the reaching point (e.g., the target 300 closest to the reaching point), determines a region corresponding to the reaching point (the first, second or third layer of the target 300 or the outside of the target 300), and judges whether or not the lure reaches the target 300 (processing P10). Note that, this judgment as to whether or not the lure reaches the target 300 can be made based on a judgment of contact between the trajectory of the lure 11 and a coordinate plane constituting the water surface.

In short, the CPU 52 is used as an example of a control part for controlling the progress of the game by moving the lure 11, which is set to be moveable in the virtual space, from the angler position or the position determined by backswing, being an example of the reference position, to the target 300. Accordingly, the CPU 52 determines an arrival position at which the lure 11, having started movement from the reference position, arrives (reaching point) in the virtual space, in response to the player's operation.

The target 300 is associated with, for example, the central coordinates and the radius of each layer and stored in the storage apparatus 51, and the CPU 52 compares the coordinates of the reaching point with the central coordinates of the target 300 to calculate and judge which region (with which radius) of which target 300 includes the reaching point (processing P10).

If it is judged that the lure 11 reaches the water surface in the target 300, the CPU 52 changes (reduces) the size of the target 300 as described above (processing P11), and causes the rendering processor 56 to provide corresponding display. Also, when the lure 11 reaches the water surface, the CPU 52 arranges fishes in the virtual space.

For example, the CPU 52 generates random numbers used when the fish arrangement lottery table (fish-appearing table) illustrated in Table 1 is referred to (processing P12), refers to the fish arrangement lottery table corresponding to the region specified in processing P10 based on the random numbers (processing P13), and specifies information relating to the fishes (the attributes such large, middle and small in size) corresponding to the layer in which the lure 11 is located.

Figure 5:
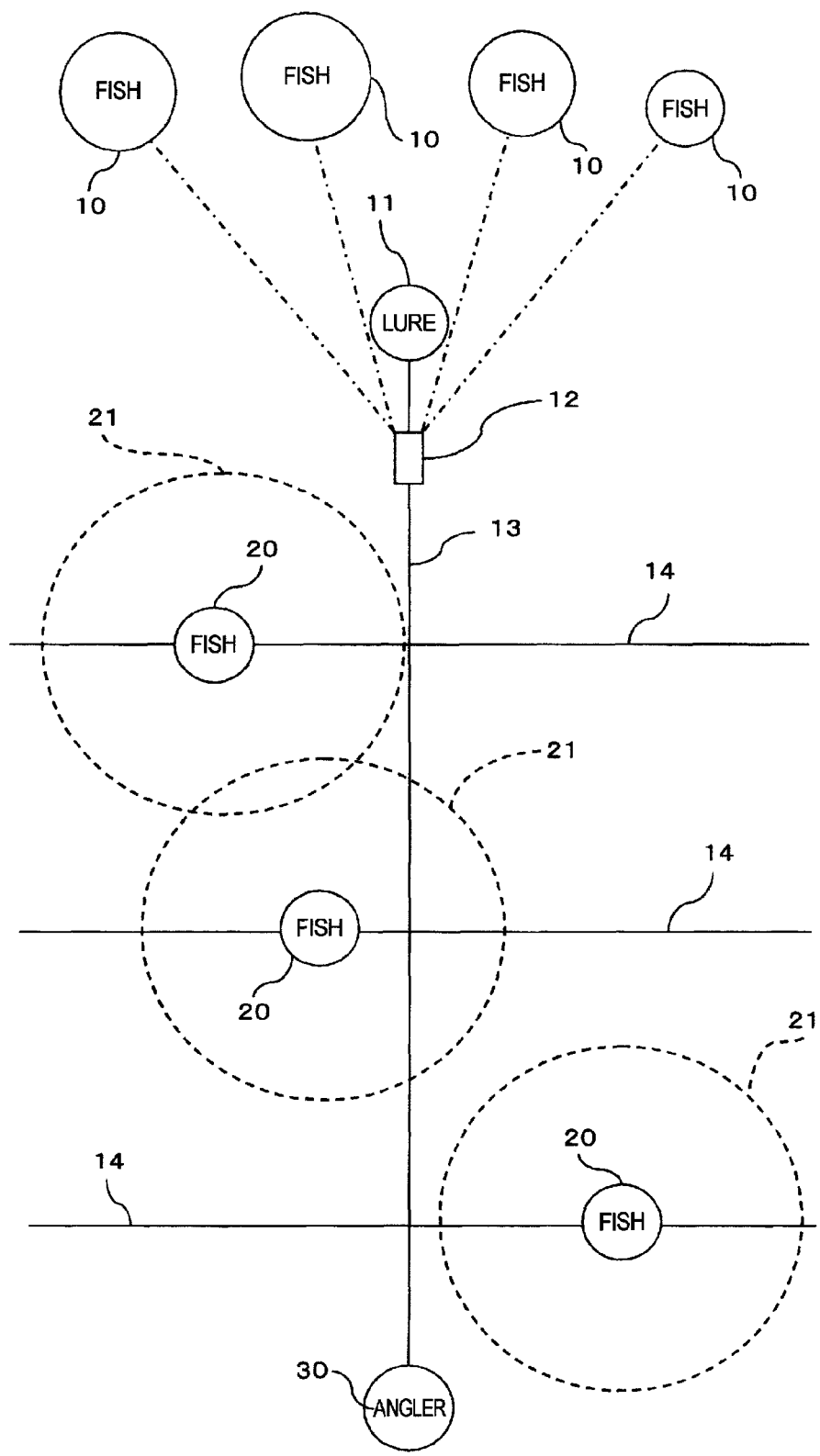
FIG. 5 is a conceptual diagram depicting an arrangement example of fishes in order to explain an operation of a fishing game according to one or more embodiments of the present invention.

The CPU 52 determines a position in the virtual space in which the fishes 10 with the specified attribute is to be arranged. The arrangement position may be, for example, within a predetermined region based on the reaching point (arrival position) of the lure 11. The region may be, for example, a region within a predetermined angle with respect to a camera (virtual viewpoint) 12 which is set so as to capture the lure 11, as depicted in FIG. 5. FIG. 5 illustrates a situation where four fishes 10 are arranged respectively in regions within +/−30 degrees and within +/−40 degrees with respect to the viewing direction of the camera 12 on the side opposite to the arrangement position of the camera 12 with the reaching point of the lure 11 therebetween (processing P14). FIG. 12 depicts an example of a game display screen in this situation. However, two of the four fishes 10 are omitted in FIG. 12.

The positions to arrange the respective fishes in the field of view of this camera 12 may be, for example, random positions determined by using the random numbers generated by the CPU 52, or may be positions spaced apart from the lure 11 by a certain distance (or distances which may differ between fishes 10) in the viewing direction of the camera 12.

As described above, in one or more embodiments of the present invention, the target 300 is clearly displayed in the game display screen, which allows the player to intuitively understand which position in the virtual space a fish with a specific attribute (e.g., a large fish) exists.

Figure 6:
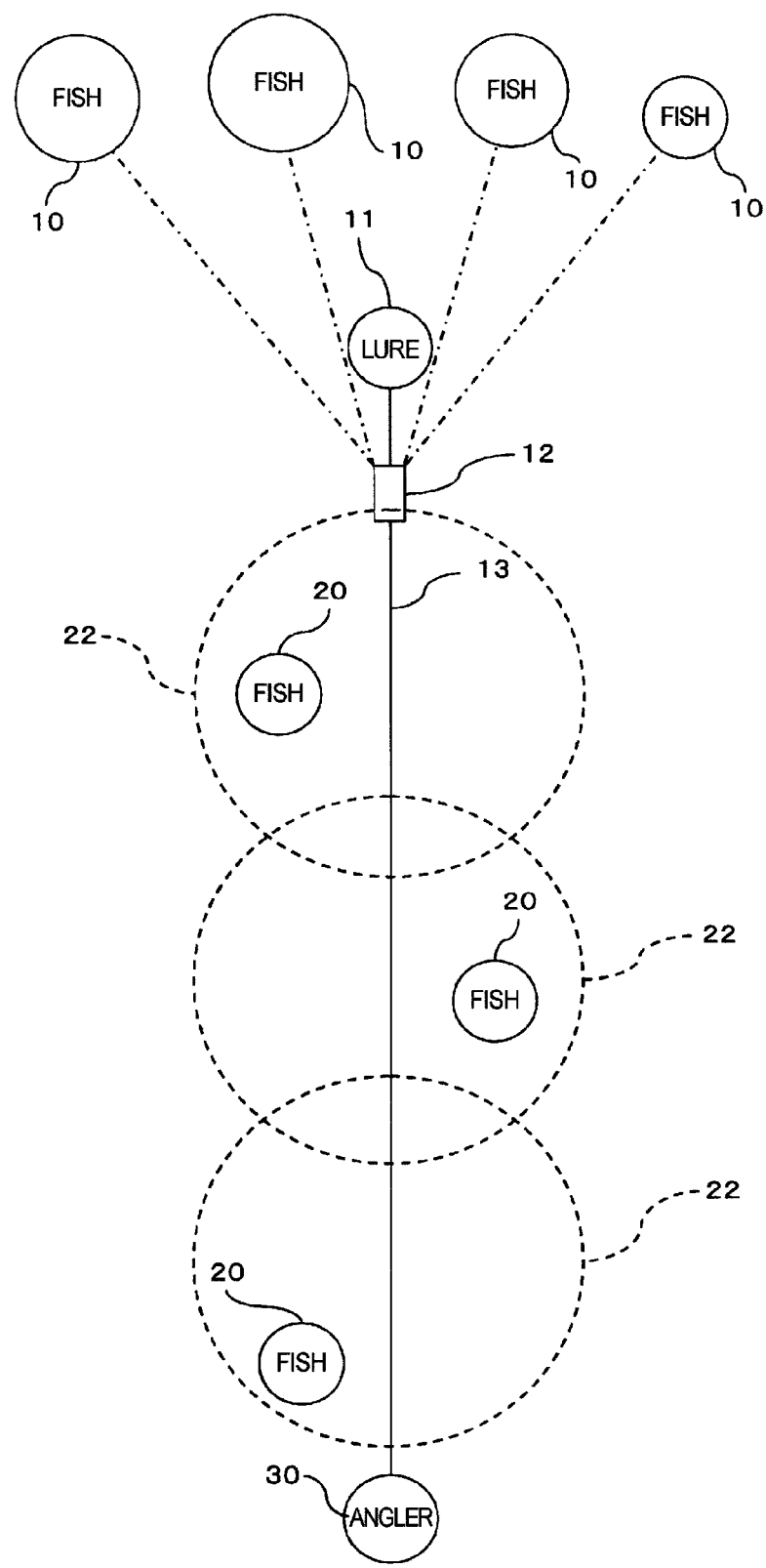
FIG. 6 is a conceptual diagram depicting another arrangement example of fishes in order to explain an operation of the fishing game according to one or more embodiments of the present invention.

The CPU 52 can arrange fishes outside the field of view of the camera 12, in addition to or as an alternative to the arrangement above. The fishes outside the field of view may be arranged around a virtual line 13 connecting the position of the lure 11 and the position of the angler character 30, as illustrated in FIG. 5 or 6. The line 13 corresponds to a passage on which the lure 11 linearly moves during retrieve.

For example, fishes 20 can be arranged at regular intervals from the angler character 30 to the reaching point of the lure 11, as indicated by the lines 14 in FIG. 5. The fish 20 can be associated with a predetermined region (reaction region) 21 centering on a current position (coordinates). This region 21 moves in accordance with the movement of the fish 20.

If the lure 11 being retrieved enters this region 21 as will be described below, the CPU 52 can judge that the lure 11 has approached the fish 20 arranged therein. Whether or not the lure 11 enters the region 21 can be calculated by comparing coordinates between the position coordinates of the lure 11 and a coordinate range defining the region 21. In this case, the CPU 52 selects the fish 20 which the lure 11 has approached as a fish 20 moving toward the lure 11. The CPU 52 can make this selection by setting a biting flag of the fish 20 corresponding to the reaction region 21 to ON. Accordingly, movement control is performed in such a way that the fish with its biting flag ON follows and bites the lure 11 (hereinafter sometimes referred to as the "biting control").

In another example, at least one fish 20 can be arranged in each predetermined region 22 which is set between the position of the angler character 30 (reference position) and the reaching point (arrival position) of the lure 11, as depicted in FIG. 6. In this case, the region 22 does not move even when the fish 20 moves. In this example as well, when the lure 11 enters one of the regions 22 while being retrieved, the CPU 52 can judge that the lure 11 has approached the fish 20 arranged therein. The CPU 52 then selects the fish 20 which the lure 11 has approached as a fish 20 moving toward the lure 11 by setting a biting flag of this fish 20 to ON, thereby performing the biting control.

Note that, in either the arrangements depicted in FIGS. 5 and 6, the biting control can be performed only for the fishes 20 appearing in the field of view of the camera 12. For example, if the biting control is performed immediately when the lure 11 enters the reaction region 21 or 22, a fish might bite the lure 11 in a region outside the display screen, which is invisible to the player. Thus, the biting control is performed so that such unnatural rendering can be avoided by providing certain waiting time (a time lag) or by taking into account the position of the camera 12 and the moving speed of the lure 11 for judging the entrance of the lure 11, and only the fish 20 in the field of view of the camera 12 makes a reaction of biting the lure 11.

The CPU 52 sets the biting flag(s) to ON for one or more of the fishes 10 arranged in the field of view of the camera 12, among the plurality of fishes 10 and 20 arranged as described above, when the lure reaches the water surface (processing P15). As a result, the rendering processor 56 performs rendering control so that the relevant fish(es) 10 moves from the arrangement position(s) thereof toward the lure 11.

Figure 13:
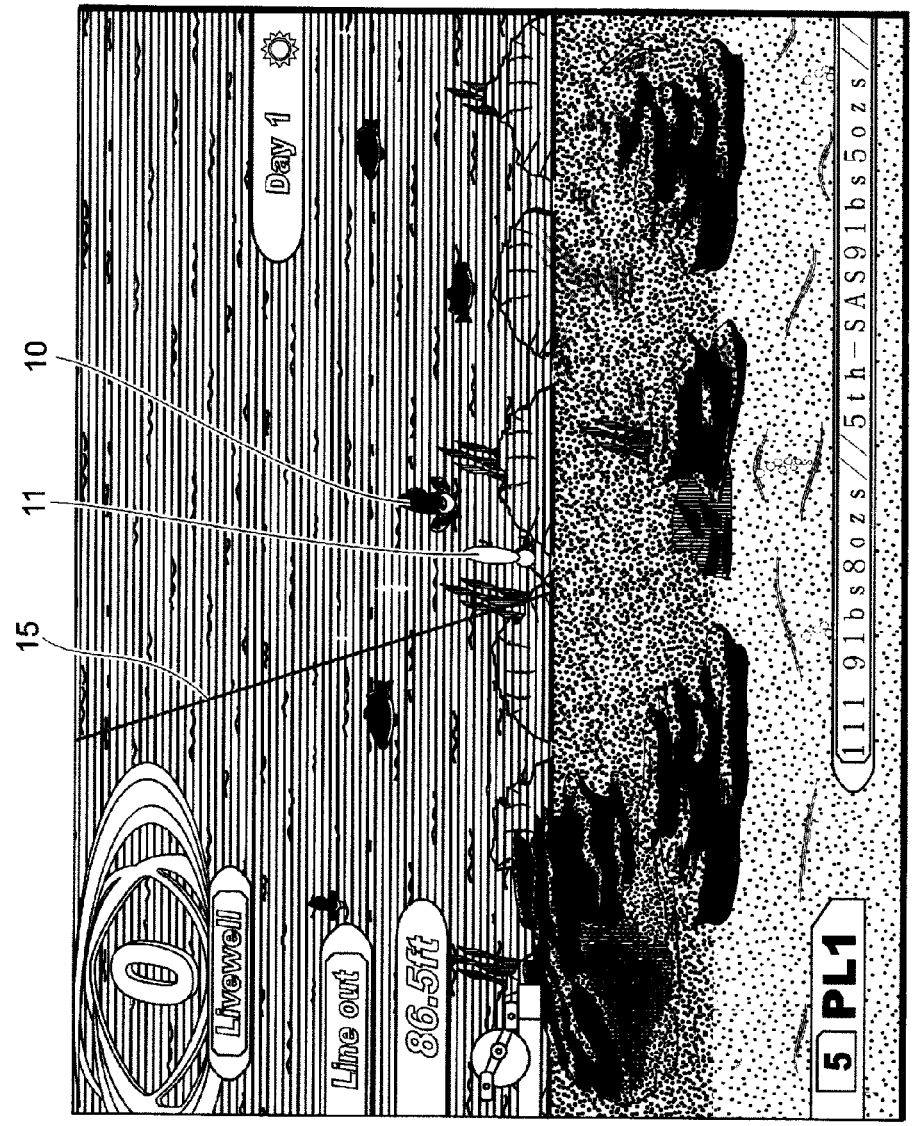
FIG. 13 is a diagram depicting an example of a display screen (depicting a fish approaching a lure) of the fishing game according to one or more embodiments of the present invention.
Figure 14:
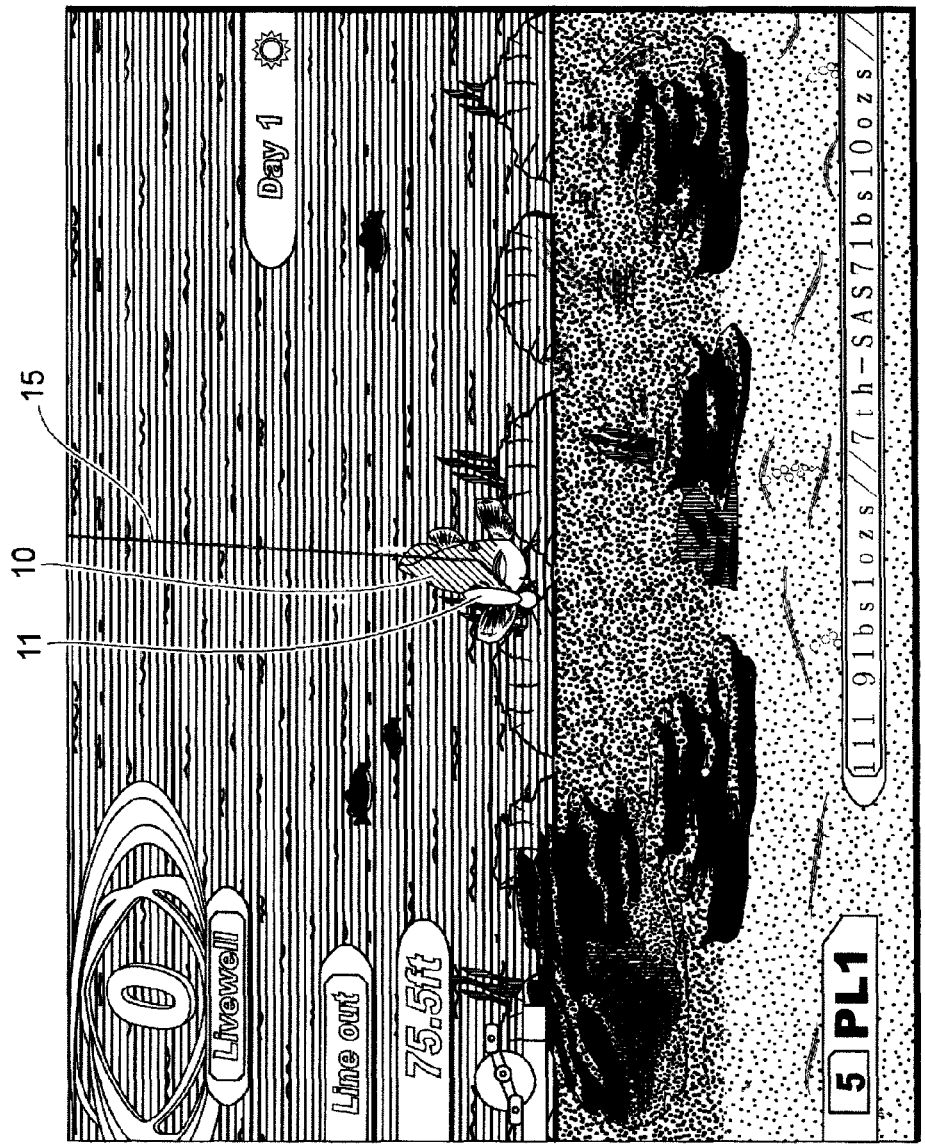
FIG. 14 is a diagram depicting an example of a display screen (depicting a fish approaching a lure) of the fishing game according to one or more embodiments of the present invention.
Figure 15:
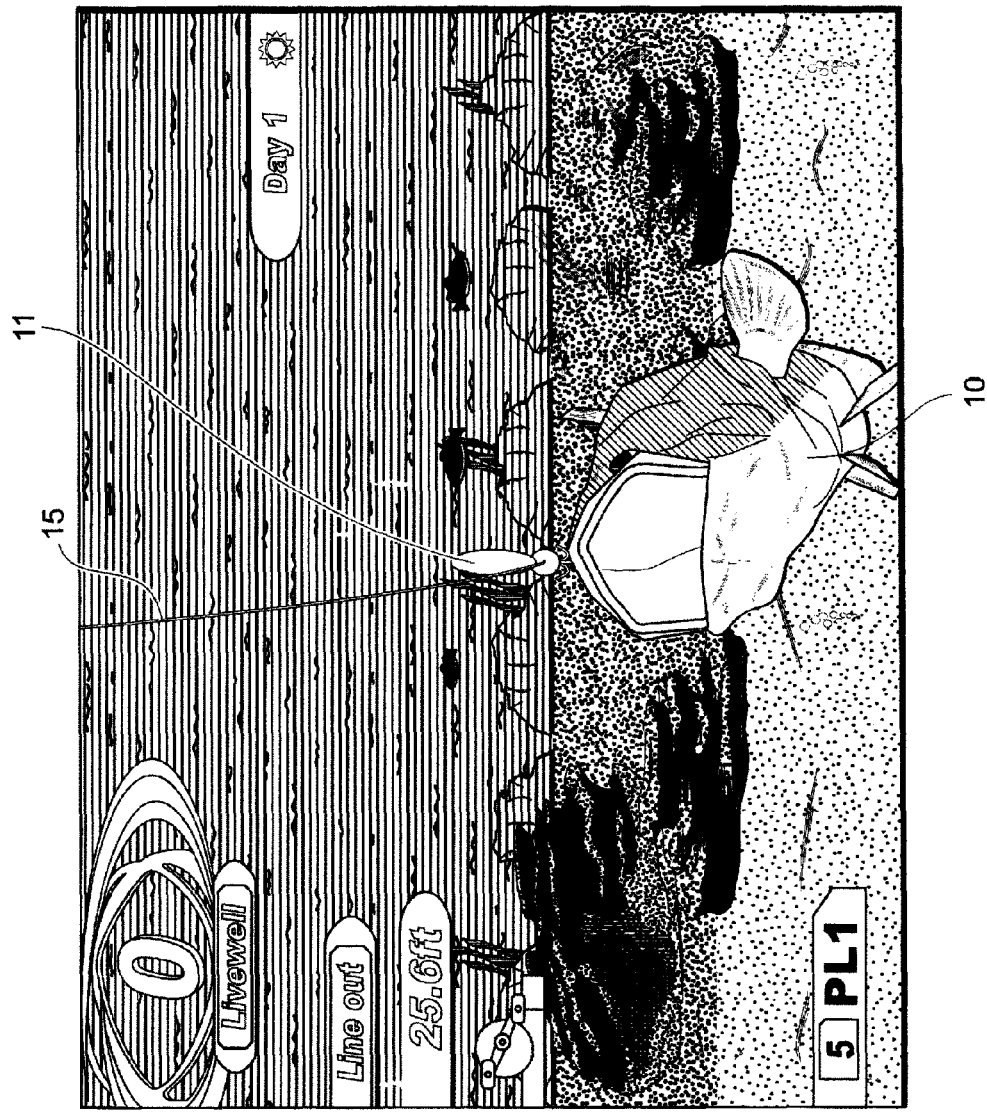
FIG. 15 is a diagram depicting an example of a display screen (depicting a fish trying to bite a lure) of the fishing game according to one or more embodiments of the present invention.

If, for example, the biting flag of the fish 10 on the right side in the display screen in the two fishes 10 illustrated in FIG. 12 is set to ON, the CPU 52 causes the rendering processor 56 to render an aspect in which the relevant fish 10 moves toward the lure 11 as illustrated in FIGS. 13 and 14 and tries to bite the lure 11 as illustrated in FIG. 15. Note that the fish 10 whose biting flag is to be set to ON may be determined at random by using random numbers generated by the CPU 52, or may be determined based on a predetermined rule (e.g., the flag of the fish 10 closest to the lure 11 is set to ON).

The player can perform retrieve by rotating the trackball 71 in any direction, i.e., forward, backward, leftward or rightward, after the lure 11 reaches the water surface. In response to this operation, the CPU 52 causes the rendering processor 56 to perform rendering processing in which the lure 11 is moved so as to return from the reaching point to the angler position (processing P15a).

Then the CPU 52 judges whether or not the fish with its biting flag ON has bit (made contact with) the lure 11 (processing P16). This judgment can be made by a calculation comparing the position coordinates of the fish and the position coordinates of the lure 11. In other words, when the comparison between the coordinates indicates that the distance between the fish and lure is zero or within a predetermined range, the CPU 52 can judge that the fish has bit (made contact with) the lure 11.

Figure 16:
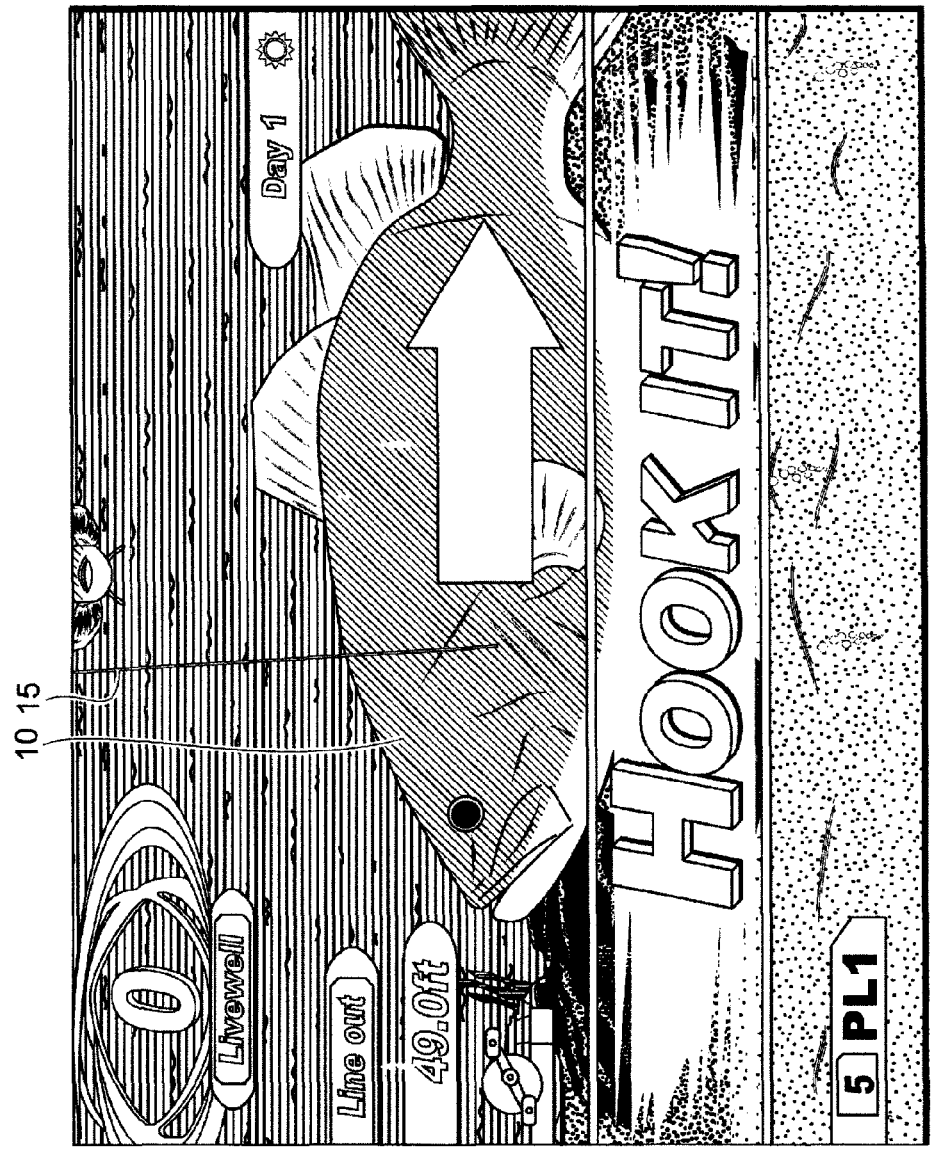
FIG. 16 is a diagram depicting an example of a display screen (hooking) of the fishing game according to one or more embodiments of the present invention.

When judging that the fish has bit the lure 11, the CPU 52 can cause the rendering processor 56 to display on the display apparatus 9 a predetermined condition which should be met in order to hit the fish. For example, the rendering processor 56 renders a mark, such as an arrow, which allows the player to expect the direction of hooking for a certain time period, as illustrated in FIG. 16 (processing P17). Note that the strength of hooking may also be rendered by, for example, changing the size of the mark.

The player can perform hooking by rotating the trackball 71 in the direction corresponding to the mark. Note that, in order not to bore the player, feint motion may be set in the motions of the fish, so that the success rate of hooking will be reduced.

When the trackball 71 is operated by the player and the CPU 52 detects that the input of rotation direction (and, optionally, the rotation speed) thereof matches with the displayed hooking direction (and, optionally, the strength) described above or mismatch therebetween remains within a certain range, the CPU 52 judges that an appropriate hooking operation was performed, i.e., the player's operation satisfied the predetermined condition, and accepts retrieving operation by the player, e.g., the input of rotation of the trackball 71 in any direction, i.e., forward, backward, leftward or rightward (processing P19).

On the other hand, if it is judged that an appropriate hooking operation was not performed (route N of processing P18), the CPU 52 proceeds to processing P31, sets the biting flag of the relevant fish to OFF, and causes the rendering processor 56 to perform rendering control in which the fish moves away from the lure 11 due to the unsuccessful hooking. Alternatively, the flag with its biting flag OFF may be deleted from the display screen (the same applies to the description below). With such a control, the load of the rendering processing can be reduced.

Note that the speed of retrieve can be changed by the rotation speed of the trackball 71. Also, the retrieve may be automatically performed independently of the player's operation. If the trackball 71 is operated to an extent greater than a predetermined amount of operation during the automatic retrieve, the automatic retrieve may be cancelled so as to enable manual retrieve by the player. In such a case, the automatic retrieve may be enabled again when the amount of operation of the trackball 71 falls below the predetermined amount.

Figure 17:
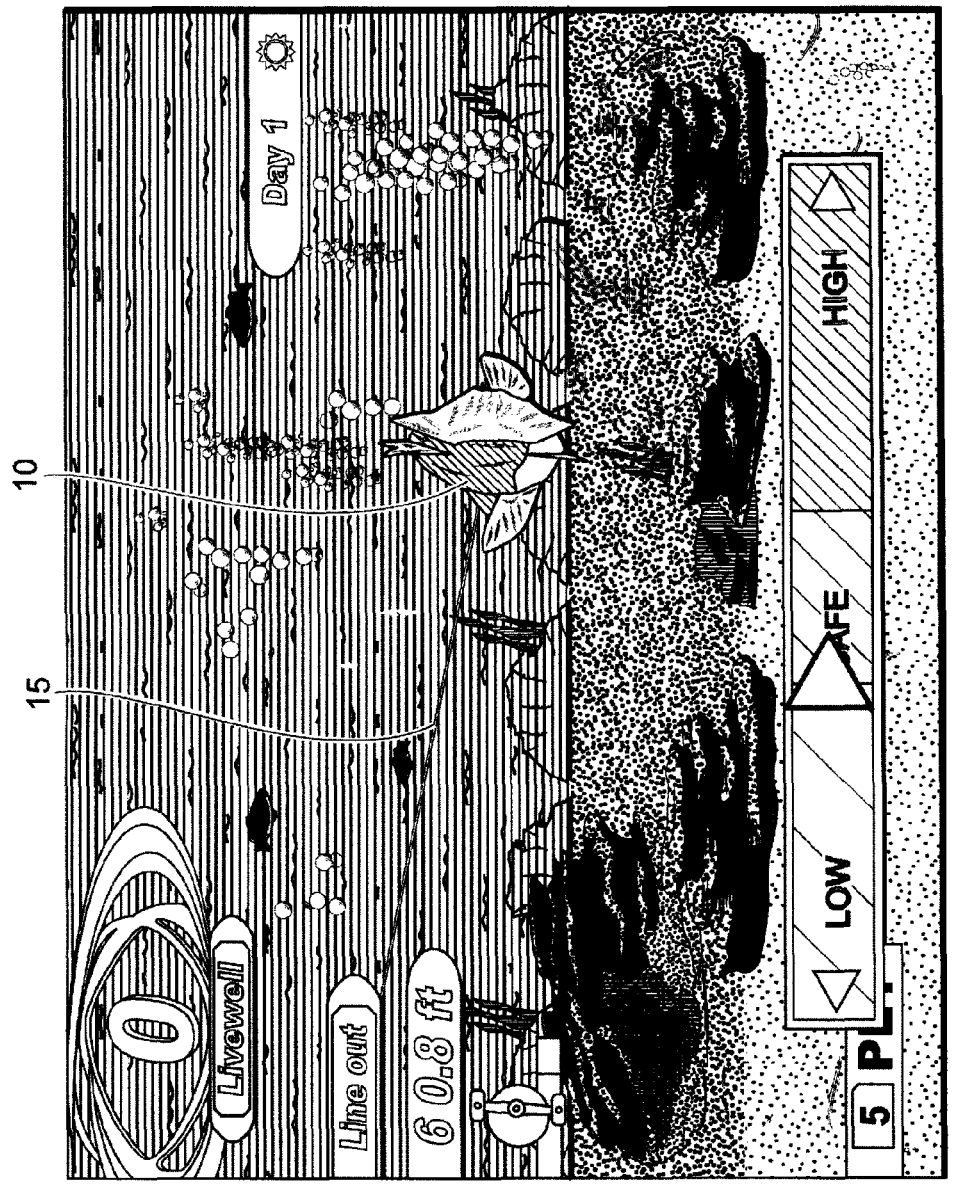
FIG. 17 is a diagram depicting an example of a display screen (a fighting mode) of the fishing game according to one or more embodiments of the present invention.
Figure 18:
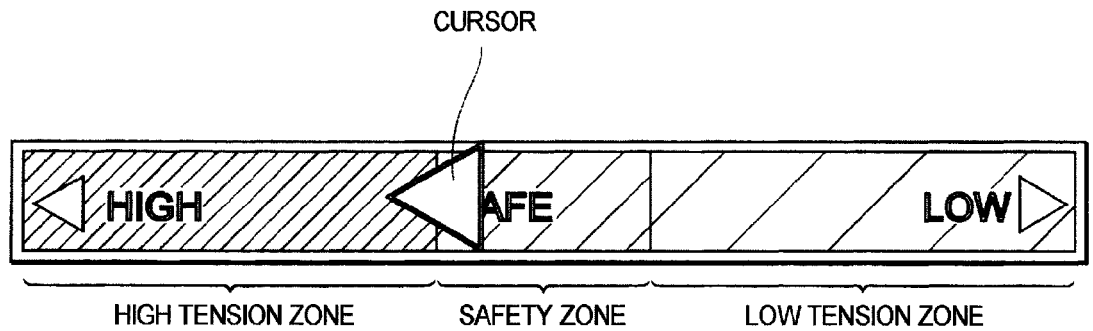
FIG. 18 is a diagram depicting a meter extracted from the display screen depicted in FIG. 17.

During the retrieve, the CPU 52 can cause the rendering processor 56 to perform rendering control in which the fish moves violently at regular time intervals. This is referred to as a fighting mode. FIG. 17 depicts an example of a display screen during the fighting mode. FIG. 17 illustrates an aspect in which the fish 10 is trying to escape in the direction away from the angler. During the fighting mode, a mark, such as an arrow or a cursor, indicating the retrieve direction as illustrated in FIGS. 17 and 18, may be displayed in a meter having a high tension zone, a safety zone and a low tension zone in a lower portion of the display screen, in order to prompt a player's input through an operation of the trackball 71 (processing P20). Note that the safety zone above indicates that an appropriate line tension is maintained while the mark (such as an arrow and a cursor) is within this zone. On the other hand, the low tension zone indicates that the line tension is low and thus the hook of the lure 11 might be disengaged from the fish while the mark is located within this zone, and the high tension zone indicates that the line tension is high and thus the line might be cut while the mark is located within this zone.

During the fighting mode, the CPU 52 can receive the player's input of through the operation of the trackball 71 (processing P21), and judges whether or not the input (the rotation direction and rotation speed) is appropriate (processing P22). The fighting mode may be repeated several times based on the above-described attribute information (e.g., the size, weight, score, capability value, etc.) of the fish. The fighting mode may not be performed for a specific fish, such as a small fish (the processing may be bypassed). Also, the rotation speed of the trackball 71, which is judged as appropriate for the hooking operation, may vary depending on the attribute information of the fish.

If the input through the operation of the trackball 71 during the fighting mode is appropriate, the CPU 52 judges that the fighting mode succeeded (route Y in processing P22). On the other hand, if the fighting mode failed (route N in processing P22), the CPU 52 sets the biting flag of the fish to OFF (processing P23), and causes the rendering processor 56 to perform rendering control in which the fish moves away from the lure.

Figure 9:
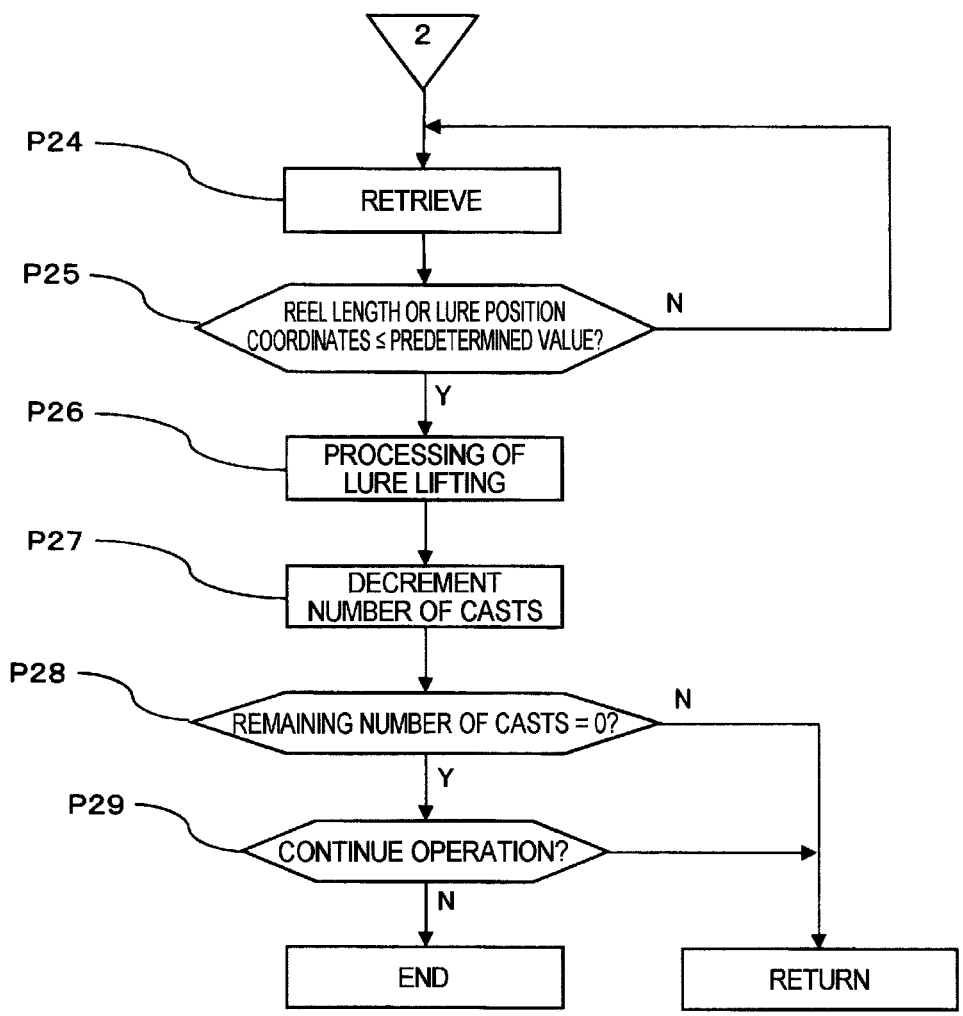
FIG. 9 is a flowchart explaining operations of the fishing game according to one or more embodiments of the present invention.

After the fighting mode ends (or when the fighting mode is not carried out), the CPU 52 performs retrieve as illustrated in FIG. 9 (processing P24), and judges whether or not the distance between the lure 11 and the angler character 30 (the length of the line) has become less than a predetermined value or the time has run out without any fish biting the lure (processing P25).

If none of the conditions above is satisfied (route N in processing P25), the CPU 52 continues the retrieve (processing P24), and performs processing for moving the lure 11 to the angler position. At this time, if the fish has been hit, the CPU 52 performs processing for moving the hit fish to the angler position with the lure 11, and causes the rendering processor 56 to render such an aspect.

In processing P25, if one of the conditions is satisfied (route Y in processing P25), the CPU 52 performs processing for lifting the lure (processing P26), and decrements the remaining number of casts (processing P27).

The CPU 52 checks whether or not the remaining number of casts is zero (processing P28), and if it is zero (route Y in processing P28), for example, the CPU 52 causes the rendering processor 56 to display a continue screen on the display apparatus 9 for a certain time period. Note that the initial value (upper limit) of the number of casts may be appropriately set; for example, the initial value may be three or six.

If the player's operation of continuing the game, e.g., an additional coin or medal inserted by the player into the slot 17, is detected while the continue screen is being displayed (route Y in processing P29), the CPU 52 returns to processing P1 and continues the execution of the game. On the other hand, if the player's operation of continuing the game is not detected while the continue screen is being displayed, the CPU 52 ends the game (route N in processing P29).

In processing P28, if the remaining number of casts is not zero (route N in processing P28), the CPU 52 returns to processing P1 and continues the execution of the game.

In processing P16 described above (see FIG. 8), if the CPU 52 judges that the fish with its biting flag ON has not bit (made contact with) the lure 11 (route N in processing P16), the CPU 52 judges whether or not the distance between the fish with its biting flag ON and the lure 11 exceeds a predetermined value (whether or not the lure 11 is out of the reaction region 21 of the fish) (e.g., the case depicted in FIG. 5), or whether or not the current position of the fish with its biting flag ON is out of the predetermined region 22 (e.g., the case depicted in FIG. 6), or whether or not a time period in which the fish with its biting flag ON follows the lure 11 exceeds a certain time period (processing P30).

If it is judged that the lure 11 is out of the reaction region 21 or 22 (the lure 11 and the fish with its biting flag ON separate away from each other) or that the time period in which the fish with its biting flag ON follows the lure 11 exceeds the certain time period (route Y in processing P30), the CPU 52 sets the biting flag of the fish to OFF (processing P31), and cancels the state where the fish is selected as a fish moving toward the lure 11. At this time, the rendering processor 56 renders, for example, an aspect in which the fish gives up following the lure and moves away from the lure 11.

With such processing, the player can intentionally avoid a fish having a specific attribute from biting the lure 11 by increasing the speed of retrieve (the rotation speed of the trackball 71) and separating the lure 11 away from the fish by a predetermined distance or for a predetermined time period. The fish having the specific attribute is, for example, a fish of a small size (weight), which the player does not want to catch.

Accordingly, the player can intentionally select a fish having desired attribute, such as the size, as a target to hit, which allows the player to suppress an unintentional increase in the number of casts in the fishing game with a limitation in the number of casts.

On the other hand, if it is judged that the lure 11 is not out of the reaction region 21 or 22 of the fish, or the time period in which the fish with its biting flag ON follows the lure 11 does not exceed the certain time period in processing P30 (route N in processing P30), the CPU 52 performs processing of processing P16 onward.

Then the CPU 52 checks whether there is a fish with its biting flag ON (processing P32), and if a fish with its biting flag ON exists (route Y in processing P32), the CPU 52 performs processing of processing P16 onward. If such a fish does not exist (route N in processing 32), the CPU 52 judges whether or not the lure 11 has approached the fish outside the field of view of the camera 12 when it reaches the water surface in processing P14 (processing P33). This approach can be detected based on the entrance (contact) of the lure 11 in (with) the reaction regions 21 or 22 of the fishes which are arranged at regular intervals or in the respective predetermined regions between the position of the lure 11 and the position of the angler character 30 as illustrated in FIG. 5 or 6.

As a result, when the approach of the lure 11 to the fish 20 (the entrance of the lure 11 in the reaction region 21 or 22) is detected (route Y in processing P33), the CPU 52 returns to processing P15, selects a fish corresponding to the reaction region 21 or 22 which the lure 11 has approached (by, for example, setting the biting flag thereof to ON), and performs the processing of processing P16 onward.

Specifically, if it is judged that the fish arranged in the field of view of the camera has not bit (made contact with) the lure 11 when the lure reaches the water surface (i.e., the case where the fish has given up biting the lure 11 or the lure 11 successfully escape from the fish), the CPU 52 selects any of the fishes arranged at regular intervals or in the respective predetermined regions 22 as illustrated in FIG. 5 or 6 (by setting the biting flag thereof to ON), and moves the selected fish from the arrangement position toward the lure 11.

Such a configuration can produce a situation in which, when the lure 11 enters the reaction region 21 or 22 of a fish 20 arranged outside the field of view of the camera 12 and approaches the fish 20 during the retrieve of the lure 11 and the fish 20 enters the field of view of the camera 12, this fish 20 reacts to the lure 11 to bite it.

Accordingly, a natural motion in which only the fishes visible to the player on the display apparatus 9 follow and try to bite the lure 11 can be expressed. Also, fishes 20 which follow and try to bite the lure 11 are limited to those within the field of view of the camera 12, the load of the rendering processing can be reduced.

During the retrieve, the player can add a lure action by operating the trackball 71, for example, leftward or rightward. The lure action may depend on the type of the lure being used. For example, one or more of stop-and-go, straight retrieve, and bottom knocking may be added as a lure action.

When the lure action is added, the reaction region 21 or 22 can be changed or the activity of a bass in the reaction region 21 or 22 can be changed, in accordance with the mount of operation of the frequency of change. The activity represents an index indicative of the degree of bass's will to bite the lure, which is reflected in a motion such that a bass with a higher activity follows and tries to bite the lure 11 more aggressively.

Accordingly, the configuration above can produce a motion in which, when an appropriate lure action is added, a fish arranged farther away from the lure or a fish with a higher rank in size among the fishes present in the field of view of the camera 12 will follow and try to bite the lure 11 by, for example, enlarging the reaction region 20 or 21 or by increasing the activity of the fish.

If the lure 11 entering in any of the reaction region 21 and 22 is not detected (route N in processing P33), the CPU 52 performs the processing of processing P25 onward.

As described above, according to one or more embodiments of the present invention, a point where a fish having a specific attribute exists with a high probability can be displayed as a target on the water surface in the virtual space in the display screen, and the position to cast the lure can be clearly indicated to the player, thereby allowing the player to cast the lure while checking the target.

The game apparatus 1 described above may be configured so as to ensure that even a player, such as a beginner and a child, who does not understand the content of the game can catch fishes of a certain size or small only by simply rotating the trackball 71 in a certain direction, while technique a certain level is required in order to catch fishes larger than the certain size.

Also, a bonus game may appear during the progress of the fishing game described above. For example, in a case where a plurality of stages (e.g., different fishing spots) exists, a bonus stage may appear after each stage or after every several stages. For example, in a case where, in a four-day fishing tournament, the first to fourth days correspond to stages respectively (four stages exist in total), a bonus game may be provided after each stage or every two stages.

The timing at which bonus game appears may be set regularly as in the example above or irregularly such that the bonus game may appear or may not appear (e.g., set at random using random numbers). The timing of bonus game may be appropriately changed.

There may be one or more kinds of bonus games. If two or more kinds of bonus games are provided, the next bonus game may be changed regularly or irregularly. Examples of the bonus game may include a game in which a player is required to control the behavior of the lure proceeding in the water so that the lure passes through a plurality of circles set in the water in a predetermined sequence, and a game in which the player is required to break balloons aligned in series by casting the lure.

The player who has got a high score in such a bonus game may be provided with a special lure. Examples of such a special lure may include a lure with a larger flight distance than normal lures, a lure which can hit a fish with a larger size (weight) more easily (in other words, a lure which indicates no interest in a bass with a small size).

The game may be configured so that the player provided with the special lure can use the special lure in stages after the bonus game. At that time, the stages where the special lure is available may be designated (limited). In addition, the number of times that the player can use the special lure may also be limited.

Instead of such a special lure, the player may be provided with a gift. For example, if the game apparatus 1 is installed in a store such as a café bar, the game apparatus 1 may be configured to issue a receipt which is exchangeable with goods, such as beer, served in the store.

Although one or more embodiments above have described a fishing game apparatus as an example of the game apparatus 1, the technical concept described above may be applicable to other games. One example of such games would be an American football game, in which a ball thrown by a quarterback, a candidate team member (receiver) who can catch the ball and an opposite team member are regarded as a first movable object, a target and a second movable object, respectively.

In this case, by associating each candidate receiver with information regarding an opposite team member (attributes such as the height, weight, speed, strength of tackle and position of the player), it is possible to perform display control in which opposite team players with different attributes will appear around the receiver depending on the position where the receiver has caught the ball.

DESCRIPTION OF REFERENCE SYMBOLS

1: game apparatus, 2: housing, 3: lateral plate, 4: front plate, 6: top plate, 7: operation table, 10, 20: fish (character), 11: lure (character), 12: camera (virtual view point), 15: fishing line (line) (character), 30: angler (character), 70: control apparatus, 71: game controller (trackball), 72: button group, 72a: start button, 72b, 72c: button, 9: display apparatus, 17: slot, 18: display device, 51: program data storage apparatus, 52: CPU, 53: system memory, 54: boot ROM, 55: bus arbiter, 56: rendering processor, 57: graphic memory, 58: sound processor, 59: sound memory, 61: speaker, 110: fishing boat (character), 200: pier (character), 300: target While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A game apparatus comprising:
   an input device operated by an operator in order to perform a game operation;
   a game controller that controls a progress of a game by moving a first movable object from a reference position toward a target, the first movable object being set to be movable in a virtual space; and
   a storage apparatus that stores target information for specifying information relating to a second movable object for each of a plurality of regions, the second movable object being set to be movable toward the first movable object, the plurality of regions being set for the target,
   wherein the game controller executes:
   determination processing to determine, in response to an operation by the operator, an arrival position of the first movable object which has started the movement from the reference position;
   judgment processing to judge in which region of the plurality of regions the first movable object at the arrival position is located;
   specification processing to specify the information relating to the second movable object corresponding to the region in which the first movable object is located, with reference to the target information read from the storage apparatus; and
   arrangement processing to arrange the second movable object in the virtual space based on the specified information relating to the second movable object.

2. The game apparatus according to claim 1, wherein the game controller executes processing to change a size of the target when the judgment processing judges that the arrival position of the first movable object is located in any one of the plurality of regions.

3. The game apparatus according to claim 2, wherein the information relating to the second movable object comprises attribute information indicating at least one of a size, weight, score and capability value of the second movable object,
   wherein the target information comprises probability information comprising a plurality of selection probabilities for respective attributes, the selection probabilities being respectively associated with the regions, and
   wherein the specification processing refers to the probability information to specify the attribute of the second movable object based on the selection probability associated with the judged region.

4. The game apparatus according to claim 2,
   wherein the input device comprises a rotating element that is provided so as to be rotatable forward, backward, leftward and rightward, and
   wherein the game controller receives signals indicating a rotation speed and a rotation angle of the rotating element from the input device to execute processing to determine the arrival position of the first movable object.

5. The game apparatus according to claim 2, wherein the game controller receives from the input device a signal for changing the reference position within a predetermined range and executes processing to determine a trajectory along which the first movable object moves based on the changed reference position.

6. The game apparatus according to claim 2,
wherein the arrangement processing arranges at least one second movable object in a certain region based on the arrival position or in each of predetermined regions set between the reference position and the arrival position,
wherein the game controller executes:
processing to select, upon a judgment that the first movable object approaches the arranged second movable object, the second movable object approached by the first movable object as a second movable object moving toward the first movable object; and
processing to cancel, upon a judgment that the selected second movable object and the first movable object move away from each other, the selection of the second movable object.

7. The game apparatus according to claim 1,
wherein the information relating to the second movable object comprises attribute information indicating at least one of a size, weight, score and capability value of the second movable object,
wherein the target information comprises probability information comprising a plurality of selection probabilities for respective attributes, the selection probabilities being respectively associated with the regions, and
wherein the specification processing refers to the probability information to specify the attribute of the second movable object based on the selection probability associated with the judged region.

8. The game apparatus according to claim 7,
wherein the input device comprises a rotating element that is provided so as to be rotatable forward, backward, leftward and rightward, and
wherein the game controller receives signals indicating a rotation speed and a rotation angle of the rotating element from the input device to execute processing to determine the arrival position of the first movable object.

9. The game apparatus according to claim 7, wherein the game controller receives from the input device a signal for changing the reference position within a predetermined range and executes processing to determine a trajectory along which the first movable object moves based on the changed reference position.

10. The game apparatus according to claim 7,
wherein the arrangement processing arranges at least one second movable object in a certain region based on the arrival position or in each of predetermined regions set between the reference position and the arrival position,
wherein the game controller executes:
processing to select, upon a judgment that the first movable object approaches the arranged second movable object, the second movable object approached by the first movable object as a second movable object moving toward the first movable object; and
processing to cancel, upon a judgment that the selected second movable object and the first movable object move away from each other, the selection of the second movable object.

11. The game apparatus according to claim 1,
wherein the input device comprises a rotating element that is provided so as to be rotatable forward, backward, leftward and rightward, and
wherein the game controller receives signals indicating a rotation speed and a rotation angle of the rotating element from the input device to execute processing to determine the arrival position of the first movable object.

12. The game apparatus according to claim 11, wherein the game controller receives from the input device a signal for changing the reference position within a predetermined range and executes processing to determine a trajectory along which the first movable object moves based on the changed reference position.

13. The game apparatus according to claim 11,
wherein the arrangement processing arranges at least one second movable object in a certain region based on the arrival position or in each of predetermined regions set between the reference position and the arrival position,
wherein the game controller executes:
processing to select, upon a judgment that the first movable object approaches the arranged second movable object, the second movable object approached by the first movable object as a second movable object moving toward the first movable object; and
processing to cancel, upon a judgment that the selected second movable object and the first movable object move away from each other, the selection of the second movable object.

14. The game apparatus according to claim 1, wherein the game controller receives from the input device a signal for changing the reference position within a predetermined range and executes processing to determine a trajectory along which the first movable object moves based on the changed reference position.

15. The game apparatus according to claim 14,
wherein the arrangement processing arranges at least one second movable object in a certain region based on the arrival position or in each of predetermined regions set between the reference position and the arrival position,
wherein the game controller executes:
processing to select, upon a judgment that the first movable object approaches the arranged second movable object, the second movable object approached by the first movable object as a second movable object moving toward the first movable object; and
processing to cancel, upon a judgment that the selected second movable object and the first movable object move away from each other, the selection of the second movable object.

16. The game apparatus according to claim 1,
wherein the arrangement processing arranges at least one second movable object in a certain region based on the arrival position or in each of predetermined regions set between the reference position and the arrival position,
wherein the game controller executes:
processing to select, upon a judgment that the first movable object approaches the arranged second movable object, the second movable object approached by the first movable object as a second movable object moving toward the first movable object; and
processing to cancel, upon a judgment that the selected second movable object and the first movable object move away from each other, the selection of the second movable object.

17. A computer program stored on a tangible computer readable medium comprising:
computer readable code configured to cause a computer to receive a game operation performed by an operator of a game;
computer readable code configured to cause a computer to control a progress of a game by moving a first movable object from a reference position toward a target, the first movable object being set to be movable in a virtual space;
computer readable code configured to cause a computer to store target information for specifying information relating to a second movable object for each of a plurality of regions, the second movable object being set to be movable toward the first movable object, the plurality of regions being set for the target;

computer readable code configured to cause a computer to determine, in response to an operation by the operator, an arrival position of the first movable object which has started the movement from the reference position;

computer readable code configured to cause a computer to judge in which region of the plurality of regions the first movable object at the arrival position is located;

computer readable code configured to cause a computer to specify the information relating to the second movable object corresponding to the region in which the first movable object is located, with reference to the stored target information; and computer readable code configured to cause a computer to arrange the second movable object in the virtual space based on the specified information relating to the second movable object.

18. A tangible computer-readable medium recording a game program which causes a computer to function a game apparatus, the game apparatus comprising:

an input device operated by an operator in order to perform a game operation;

a game controller that controls a progress of a game by moving a first movable object from a reference position toward a target, the first movable object being set to be movable in a virtual space; and a storage apparatus that stores target information for specifying information relating to a second movable object for each of a plurality of regions, the second movable object being set to be movable toward the first movable object, the plurality of regions being set in the target, wherein the game program causes the game controller to execute:

determination processing to determine, in response to an operation by the operator, an arrival position of the first movable object which has started the movement from the reference position;

judgment processing to judge in which region of the plurality of regions the first movable object at the arrival position is located;

specification processing to specify the information relating to the second movable object corresponding to the region in which the first movable object is located, with reference to the target information read from the storage apparatus; and arrangement processing to arrange the second movable object in the virtual space based on the specified information relating to the second movable object.

* * * * *